US012632466B2

(12) United States Patent
Long et al.

(10) Patent No.: US 12,632,466 B2
(45) Date of Patent: May 19, 2026

(54) UTILIZING REPLICATION TAGS ASSOCIATED WITH MESSAGES TO DETERMINE DESTINATIONS FOR STREAMING THE MESSAGES

(71) Applicant: Oracle International Corporation, Redwood Shores, CA (US)

(72) Inventors: Tony Long, Edmonds, WA (US); Arsalan Ahmad, Snohomish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 23 days.

(21) Appl. No.: 18/787,897

(22) Filed: Jul. 29, 2024

(65) Prior Publication Data

US 2026/0030259 A1 Jan. 29, 2026

(51) Int. Cl.
*G06F 16/27* (2019.01)
(52) U.S. Cl.
CPC .................................... *G06F 16/27* (2019.01)
(58) Field of Classification Search
CPC ...... G06F 16/27; G06F 16/273; G06F 16/275; G06F 16/278

USPC ......................................................... 707/625
See application file for complete search history.

(56) References Cited

U.S. PATENT DOCUMENTS

| | | | |
|---|---|---|---|
| 2019/0245918 A1* | 8/2019 | Xu ...................... | H04L 63/0869 |
| 2019/0266276 A1* | 8/2019 | Patel ................... | G06F 16/2365 |
| 2020/0159611 A1* | 5/2020 | Shilane ............... | G06F 11/0778 |
| 2023/0101337 A1* | 3/2023 | Ahmad ............... | H04L 67/1095 |
| | | | 709/201 |
| 2023/0403323 A1* | 12/2023 | Ahmad ............... | H04L 67/1095 |

* cited by examiner

*Primary Examiner* — Michael Pham
(74) *Attorney, Agent, or Firm* — Invoke

(57) ABSTRACT

A system receives a message that includes a change event associated with a source dataset for replication to a destination in a cloud environment. The system accesses a replication tag associated with the message. The replication tag includes a tag element that is mapped a destination key that identifies a destination dataset, corresponding to the destination, where the change event is to be replicated. The system determines that the tag element of the replication tag is mapped to the destination key. Responsive to determining that the tag element is mapped to the destination key, the system directs the message to the destination to replicate the change event to the destination dataset.

20 Claims, 21 Drawing Sheets

Figure 7G:
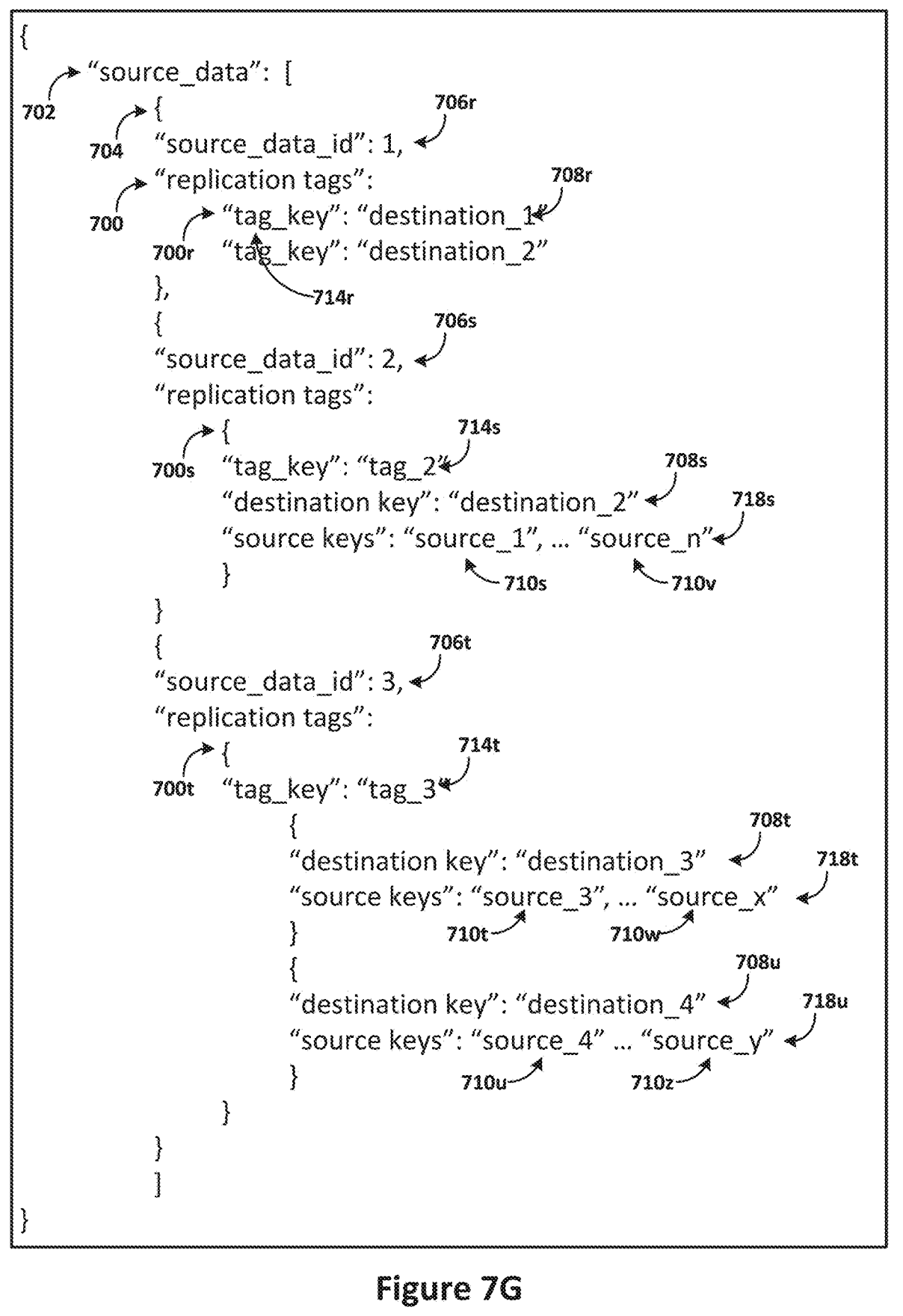

```
{
    "source_data": [
        {
            "source_data_id": 1,
            "replication tags":
                "tag_key": "destination_1"
                "tag_key": "destination_2"
        },
        {
            "source_data_id": 2,
            "replication tags":
                {
                    "tag_key": "tag_2"
                    "destination key": "destination_2"
                    "source keys": "source_1", ... "source_n"
                }
        }
        {
            "source_data_id": 3,
            "replication tags":
                {
                    "tag_key": "tag_3"
                        {
                            "destination key": "destination_3"
                            "source keys": "source_3", ... "source_x"
                        }
                        {
                            "destination key": "destination_4"
                            "source keys": "source_4" ... "source_y"
                        }
                }
        }
    ]
}
```

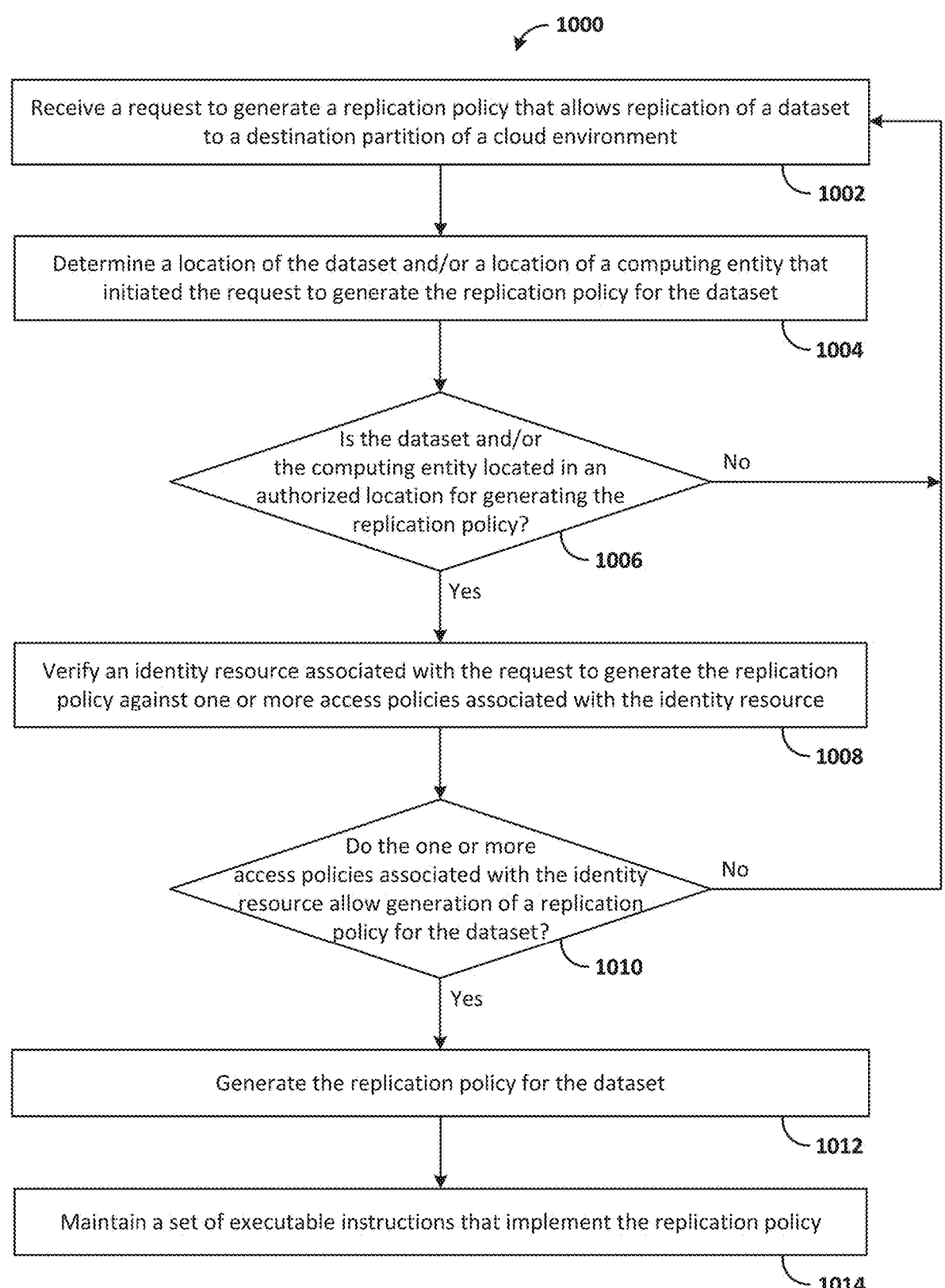

1000

Receive a request to generate a replication policy that allows replication of a dataset to a destination partition of a cloud environment

1002

Determine a location of the dataset and/or a location of a computing entity that initiated the request to generate the replication policy for the dataset

1004

Is the dataset and/or the computing entity located in an authorized location for generating the replication policy?

No

1006

Yes

Verify an identity resource associated with the request to generate the replication policy against one or more access policies associated with the identity resource

1008

Do the one or more access policies associated with the identity resource allow generation of a replication policy for the dataset?

No

1010

Yes

Generate the replication policy for the dataset

1012

Maintain a set of executable instructions that implement the replication policy

UTILIZING REPLICATION TAGS ASSOCIATED WITH MESSAGES TO DETERMINE DESTINATIONS FOR STREAMING THE MESSAGES

TECHNICAL FIELD

The present disclosure relates to replication of datasets to various partitions of a computing environment. More particularly, the present disclosure relates to replicating data from a first partition of a cloud environment to a second partition of the cloud computing environment.

BACKGROUND

A computing environment, such as a cloud computing environment, includes various datasets. The datasets may be replicated from a source location to various destination locations of the computing environment. In one example, a dataset may be replicated to provide a backup or alternative source of the dataset. Additionally, or alternatively, a dataset may be replicated to distribute information to various computing entities located throughout the computing environment. In one example, a dataset may be replicated as a discrete replication transaction. Additionally, or alternatively, a dataset may be replicated by distributing change events to various computing entities. The change events represent changes to a source dataset. The various computing entities apply the change events to destination datasets, for example, to synchronize the destination datasets with the source dataset.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and refer to at least one embodiment. In the drawings:

FIGS. 7A-7G schematically depict example replication tags in accordance with one or more embodiments;

FIGS. 10A and 10B are flowcharts that illustrate example operations pertaining to generating replication tags that define replication policies for replicating datasets in accordance with one or more embodiments;

DETAILED DESCRIPTION

Figure 1:
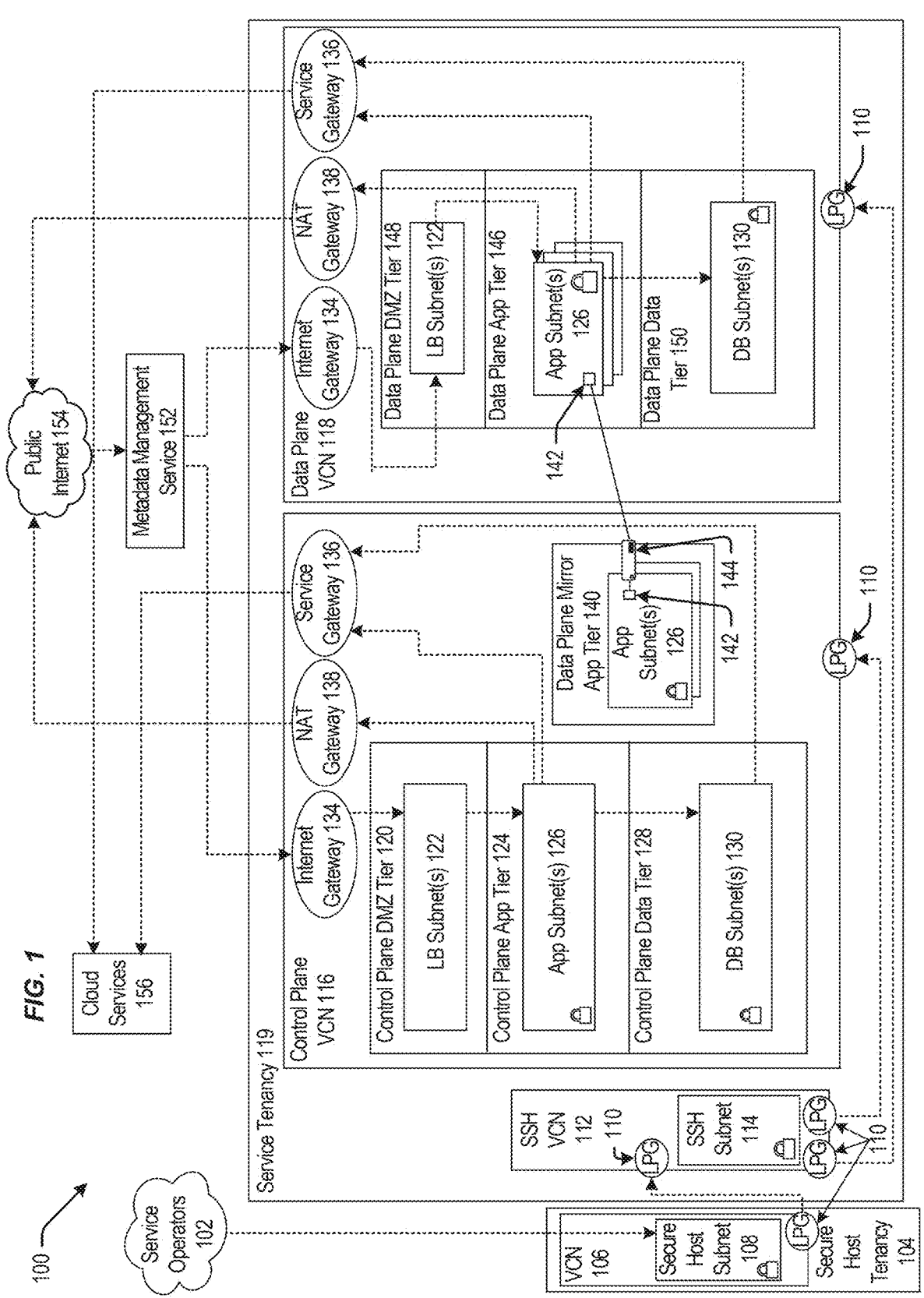
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CLOUD COMPUTING TECHNOLOGY
3. COMPUTER SYSTEM
4. SYSTEM ARCHITECTURE FOR GENERATING AND UTILIZING REPLICATION TAGS
5. EXAMPLE REPLICATION TAGS
6. EXAMPLE REPLICATION CREDENTIALS
7. EXAMPLE CHANGE EVENTS AND MESSAGES FOR STREAMING CHANGE EVENTS TO REPLICATE DATASETS
8. EXAMPLE OPERATIONS FOR GENERATING AND UTILIZING REPLICATION TAGS
9. MISCELLANEOUS; EXTENSIONS

1. General Overview

One or more embodiments generate replication policies for datasets stored in a computing environment by associating the datasets with replication tags that identify one or more destinations of the computing environment where the dataset is allowed to be replicated. A system utilizes the replication tags to determine whether to grant or deny requests to replicate the datasets. A replication tag for a dataset includes a destination key that identifies at least one partition where the dataset is allowed to be replicated. When the system receives a replication request to replicate a dataset to a partition, the replication request is accompanied by a replication credential that includes a destination identifier that identifies the partition corresponding to the replication request. The system verifies that the destination key of the replication tag associated with the dataset corresponds to the destination key included in the replication credential. Based at least on verifying that the destination key of the replication tag matches the destination key, the system replicates the dataset to the partition. The replication tag associated with a dataset indicates to the system whether the dataset is allowed to be replicated to a particular partition while also preventing the system from replicating the dataset to other partitions that are outside the scope of the replication policy indicated by the replication tag.

In one example, the system receives a request to generate a replication policy that allows replication of a dataset from one partition of a cloud environment to another partition of the cloud environment. The system generates the replication policy at least by associating the dataset with a replication tag that includes a destination key corresponding to the partition where the dataset is allowed to be replicated. The system may generate the replication tag and store the replication tag in the data structure that is utilized to verify requests to replicate the dataset. Additionally, or alternatively, the system may access an existing replication tag in the data structure and may add the destination key to the existing replication tag.

A dataset located in partition A that is allowed to be replicated to partition B may include a replication tag with a destination key such as "partition-b" that identifies partition B. The system may incorporate the destination key into a tag key or a name of the replication tag so that a partition where the dataset is allowed to be replicated can be identified based on the tag key or name of the replication tag. In one example, the tag key or name of a replication tag includes the destination key "partition-b" to indicate, based on the tag key or name of the replication tag, that the dataset associated with the replication tag is allowed to be replicated to partition B.

The system may associate a replication tag corresponding to a particular partition with one or more datasets that are allowed to be replicated to the particular partition. The replication tag may include one or more source keys that identify the particular datasets. In one example, a first dataset and a second dataset that are allowed to be replicated to partition B. The first dataset and the second dataset are associated with a replication tag that includes a first source key that identifies the first dataset and a second source key that identifies the second dataset.

The system stores the replication tags for various datasets in data structures for verifying replication requests. In one example, the system stores replication tags stored in metadata elements associated with the datasets. Additionally, or alternatively, the system stores replication tags in a data repository that includes mappings of replication tags to datasets.

In one example, the system may replicate datasets to various partitions by transmitting messages to the various partitions that include change events corresponding to the datasets. The system may insert metadata elements that include the replication tags into the messages, for example, when generating the messages in response to change events. In one example, the system inserts the metadata elements into headers of the messages. Prior to transmitting a message to a destination, the system verifies the source and/or the destination of the message based on the replication tag. In one example, the system verifies that the replication tag includes a source key corresponding to the source of the message. Additionally, or alternatively, the system may verify that the replication tag includes a destination key corresponding to the destination of the message. When the system successfully verifies the source and/or the destination of the message based on the replication tag, the system directs the message to the destination for replication. Additionally, or alternatively, the system refrains from directing a message to a destination for replication when the system is unable to successfully verify the source and/or the destination of the message based on the replication tag. In one example, the system processes a stream of messages from one or more sources for replication at one or more destinations and, based at least in part on verification of replication tags corresponding to the messages, the system directs the messages to the to the one or more destinations for replication.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on the VMs, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how components interact) can be defined by one or more configuration files. Thus, the overall topology of the infrastructure (e.g., what resources depend on one another and how resources work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively coupled to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users,' or other customers' resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
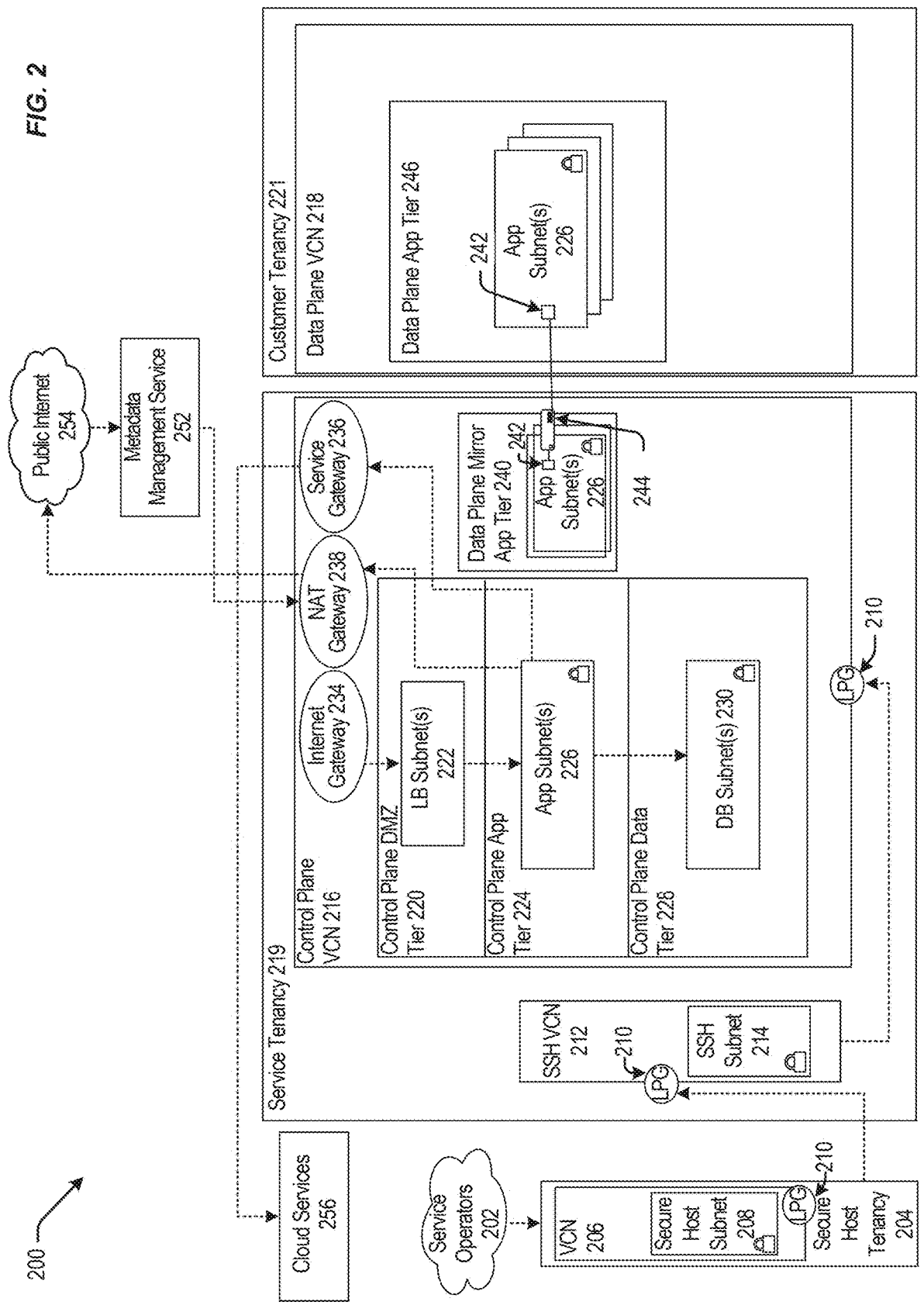

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively coupled to cloud services 256 (e.g., cloud services 156 of FIG. 1).

In some examples, the data plane VCN 218 can be contained in the customer tenancy 221. In this case, the IaaS provider may provide the control plane VCN 216 per customer, and the IaaS provider may, for the customer, set up a unique, compute instance 244 that is contained in the service tenancy 219. Compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
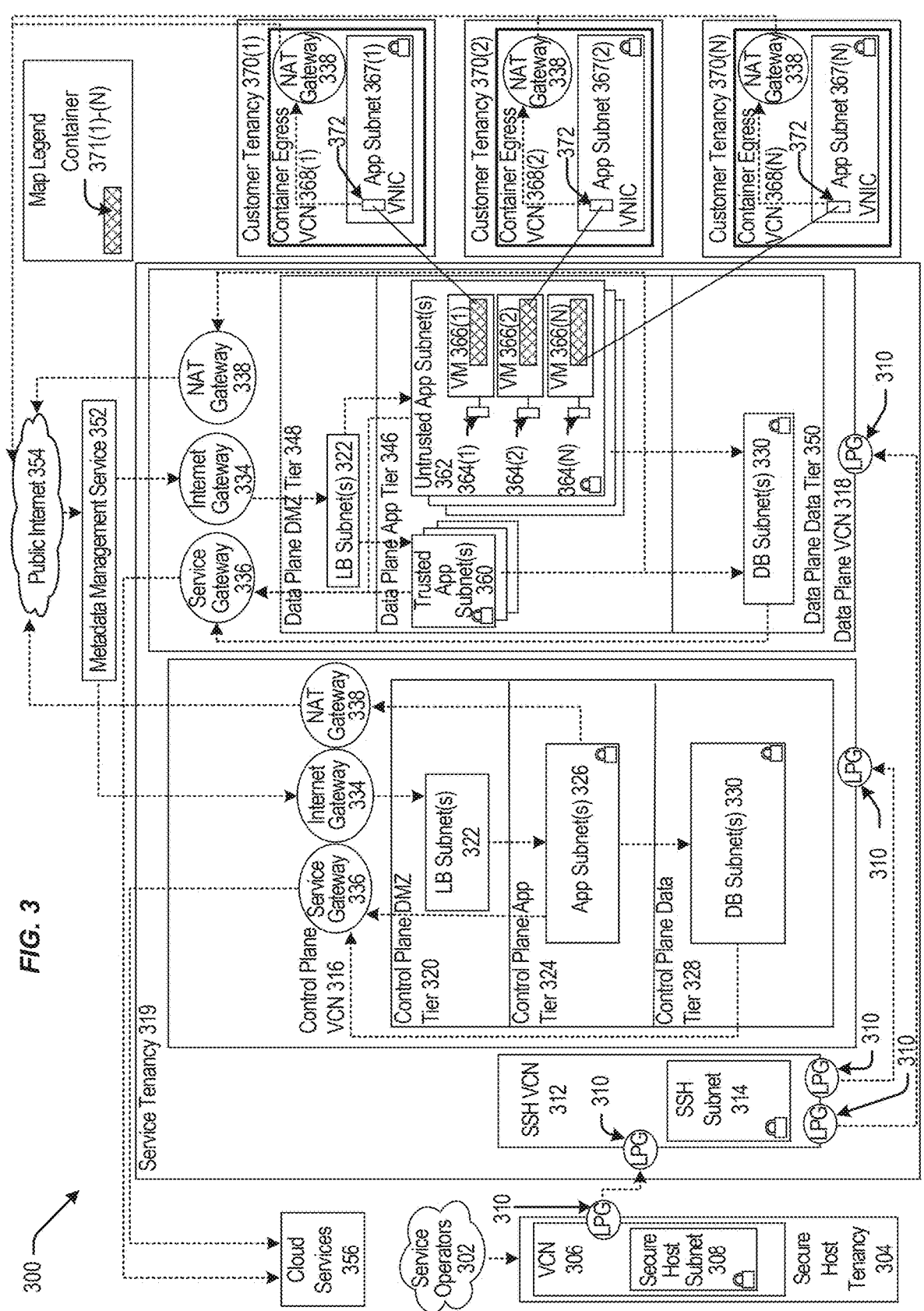

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Tenant(s) VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of the customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
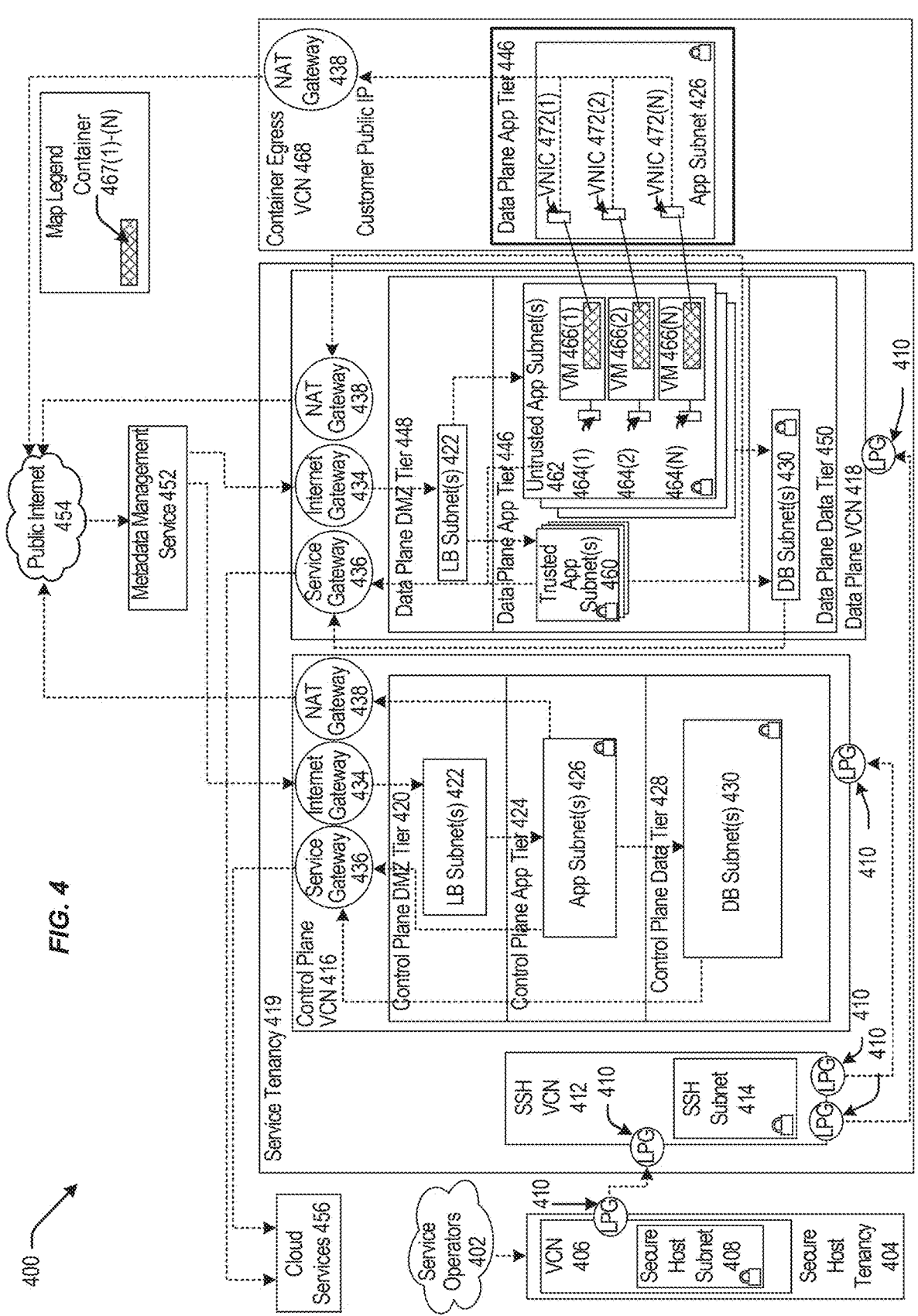

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT)

gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively coupled to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for customers can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from one other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. A node in an overlay network corresponds to a respective node in the underlying network. Hence, a node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of one another. Network resources are dynamically assigned to the requests and/or clients on an on-demand basis. Network resources assigned to a request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from one another (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on one other. A call from an application at the private cloud to an application at the public cloud (and vice versa) may be executed through the interface.

In an embodiment, tenants of a multi-tenant computer network are independent of one another. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with other tenants. Various tenant isolation approaches may be used.

In an embodiment, a tenant is associated with a tenant ID. The network resource of the multi-tenant computer network is tagged with a tenant ID. A tenant is permitted access to a particular network resource when the tenant and the particular network resources are associated with a same tenant ID.

In an embodiment, a tenant is associated with a tenant ID. An application, implemented by the computer network, is tagged with a tenant ID. Additionally, or alternatively, data structures and/or datasets, stored by the computer network, are tagged with a tenant ID. A tenant is permitted access to a particular application, data structure, and/or dataset when the tenant and the particular application, data structure, and/or dataset are associated with a same tenant ID.

As an example, a database implemented by a multi-tenant computer network may be tagged with a tenant ID. A tenant associated with the corresponding tenant ID may access data of a particular database. As another example, an entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for a particular tenant, a set of applications that the particular tenant is authorized to access. For a particular application, a list of tenant IDs of tenants authorized to access the particular application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network.

Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
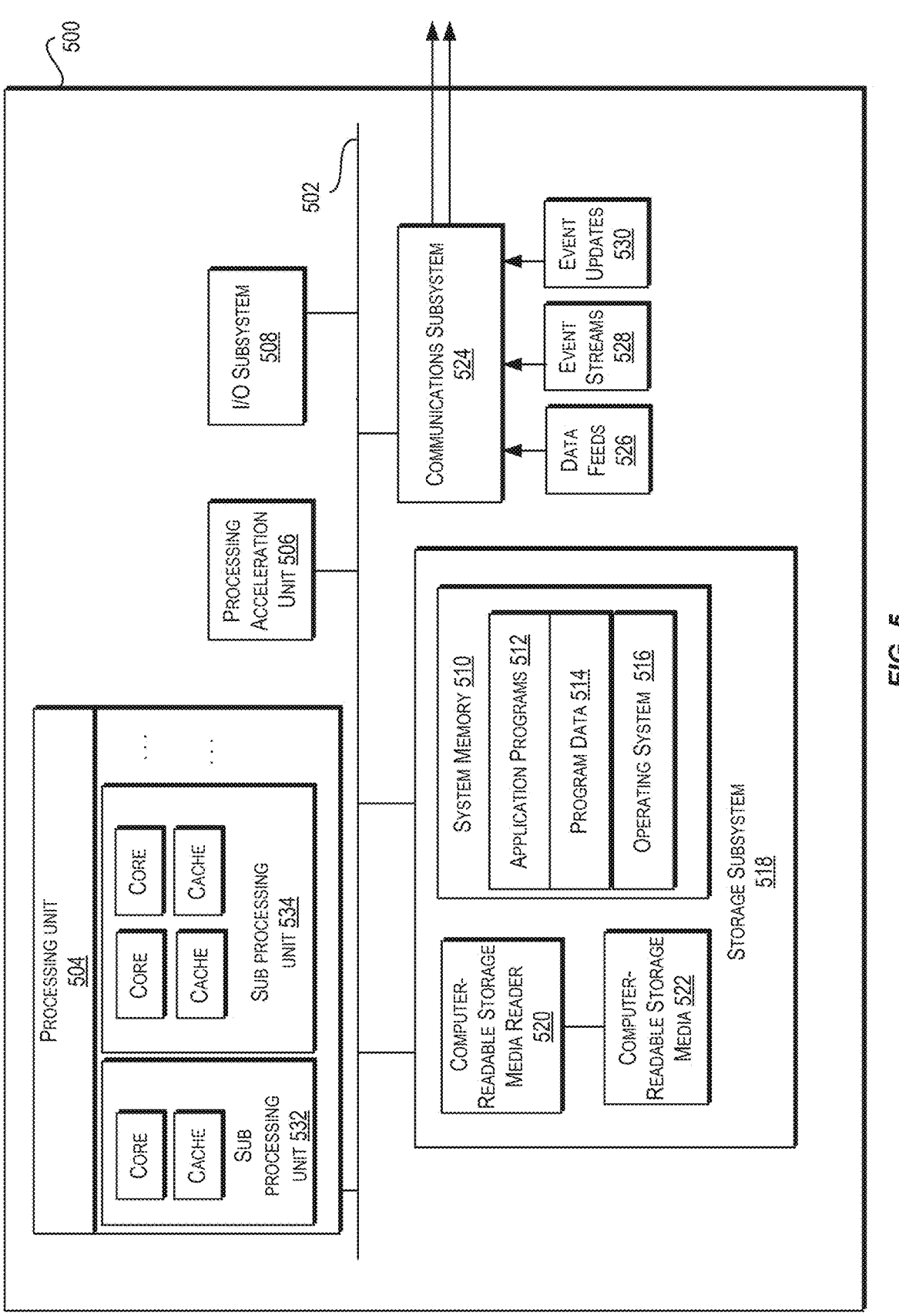
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with one another as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in the processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics, and audio/video information, such as monitors, printers, speakers, headphones, automotive navigation systems, plotters, voice output devices, and modems.

Computer system 500 may comprise a storage subsystem 518 that provides a tangible non-transitory computer-readable media for storing software and data constructs that provide the functionality of the embodiments described in this disclosure. The non-transitory computer-readable media includes instructions that cause performance of operations described herein. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random-access memory (RAM)) and/or non-volatile memory (such as read-only memory (ROM), flash memory, etc.). Different types of RAM configurations may be provided, including a static random-access memory (SRAM), a dynamic random-access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), click-stream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. System Architecture for Generating and Utilizing Replication Tags

Figure 6A:
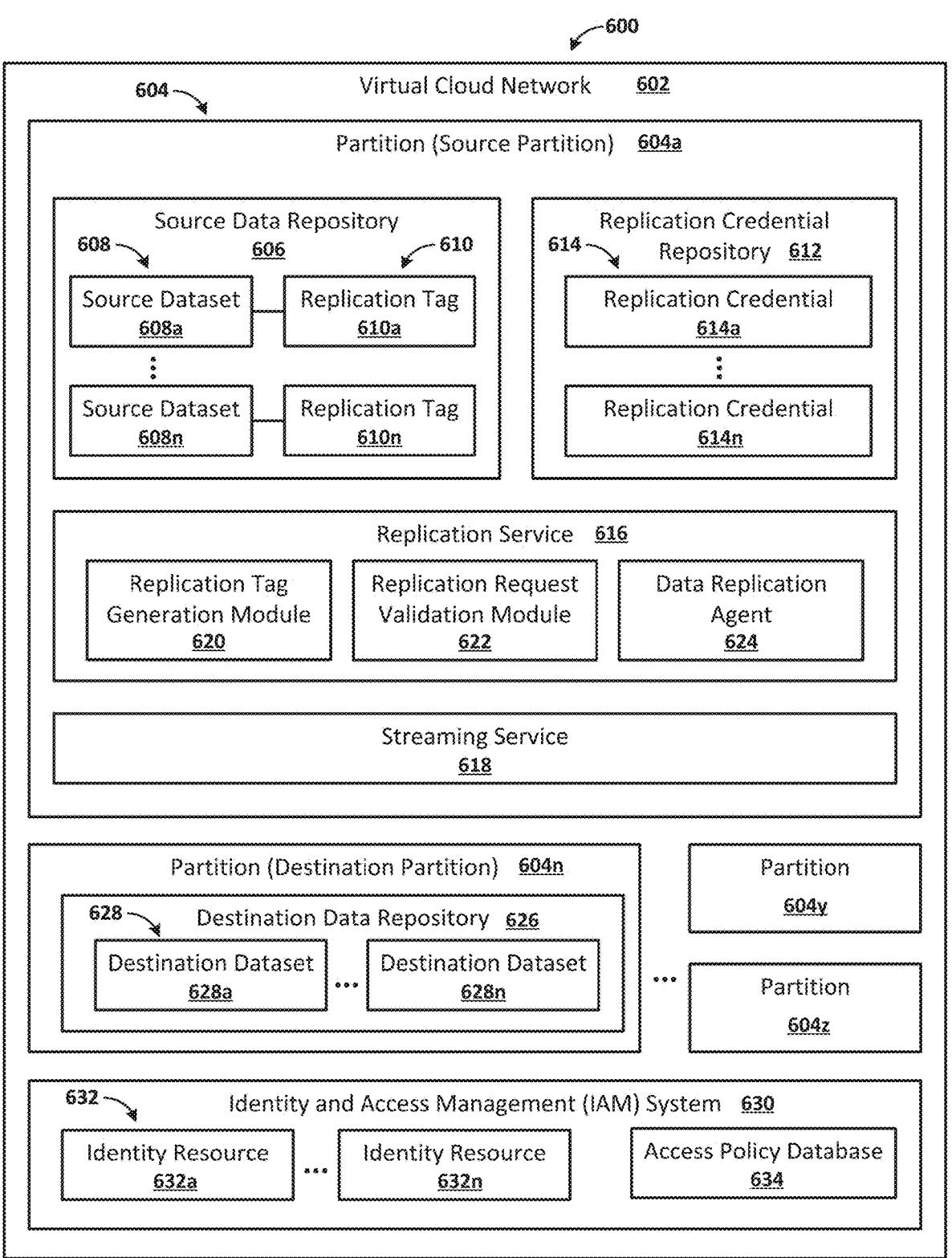
FIG. 6A illustrates features of an example system for generating and utilizing replication tags that define replication policies for replicating datasets from a source data repository to a destination data repository in accordance with one or more embodiments.
Figure 6B:
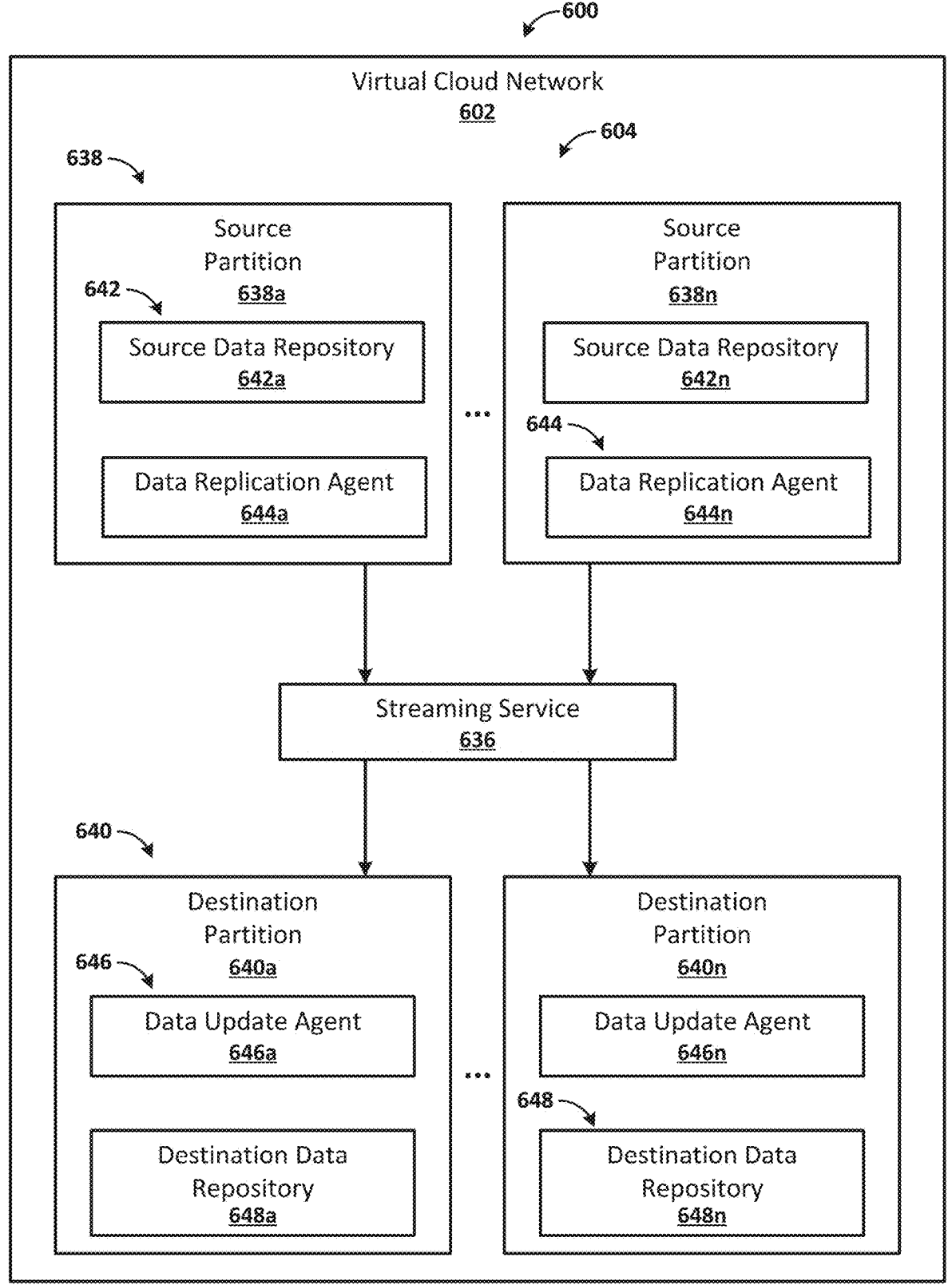
FIG. 6B illustrates further features of an example system for generating and utilizing replication tags, including streaming messages based on replication tags in accordance with one or more embodiments.

FIGS. 6A and 6B illustrate features of an example system 600 in accordance with one or more embodiments. In one or more embodiments, the system 600 refers to hardware and/or software configured to perform operations described herein, including operations pertaining to one or more of the following: generating and utilizing replication tags, replicating datasets from source data repositories to destination data repositories, and streaming messages that include changes events associated with a dataset to replicate the change events at one or more destinations. Examples of operations are described below with reference to FIGS. 10A and 10B, FIGS. 11A and 11B, and FIGS. 12A and 12B. In one example, the system described with reference to FIGS. 6A and 6B may include one or more features described above in Section 2, titled "Cloud Computing Technology," and/or in Section 3, titled "Computer System."

In one or more embodiments, the system 600 may include more or fewer components than the components described with reference to FIGS. 6A and 6B. The components described with reference to FIGS. 6A and 6B may be local to or remote from each other. The components described with reference to FIGS. 6A and 6B may be implemented in software and/or hardware. The components of system 600 may be distributed over multiple applications and/or machines. Multiple components may be combined into one application and/or machine. Operations described with respect to one component may instead be performed by another component.

As shown in FIGS. 6A and 6B, the system 600 includes a virtual cloud network 602. In one example, the virtual cloud network 602 may include a set of partitions 604 deployed in the virtual cloud network 602, such as partition 604a, partition 604n, partition 604y, and partition 604z. The partitions 604 represent logically or physically isolated portions of the virtual cloud network 602. In one example, one or more of the partitions 604 are allocated to a cloud operator or customer, such as a private label cloud (PLC) operator. Additionally, or alternatively, one or more of the partitions may be allocated to a cloud infrastructure provider. In one example, partition 604a is allocated to a PLC operator or customer, and partition 604n is allocated to a cloud infrastructure provider. Additionally, or alternatively, in one example, partition 604a is a home partition or a primary partition, for example, with respect to a PLC operator or customer, and partition 604n is a secondary or backup partition, for example, with respect to the PLC operator or customer. In one example, the partitions 604 include realms, such as PLC realms, that isolate portions of the virtual cloud network 602 as between different computing entities, such as different PLC operators or customers. Additionally, or alternatively, the partitions 604 may include tenant partitions, or tenancies, that isolate portions of the virtual cloud network 602 as between different computing entities, or tenants, such as PLC operators or customers. Additionally, or alternatively, the partitions 604 may include one or more of the following: service partitions that isolate different services or workloads, geographic partitions that isolate a portion of the virtual cloud network 602 corresponding to a particular geographic region, or network partitions that isolate the virtual cloud network 602 into separate segments or subnets.

The partitions 604 may be considered source partitions and/or destination partitions. The term "source partition" refers to a partition that includes a datasets that is replicated. The term "destination partition" refers to a partition where a dataset is replicated. A dataset may be replicated from a source data repository located in a source partition. A dataset may be replicated to a destination data repository located in a destination partition. In one example, a first partition 604 is accessible to a network entity utilizing an identity resource associated with the network entity. Additionally, or alternatively, a second partition 604 may be inaccessible to the computing entity utilizing the identity resource. The partitions 604 that are accessible or inaccessible to a computing entity may depend on one or more permissions or access policies corresponding to one or more identity resources associated with the computing entity. In one example, partition 604a is accessible using a first identity resource associated with a first computing entity and partition 604n is inaccessible using the first identity resource. Additionally, or alternatively, in one example, second partition 604n accessible using a second identity resource associated with a second computing entity and partition 604a is inaccessible using the second identity resource. In one example, the first identity resource is associated with a computing entity of a cloud service provider, and the second identity resource is associated with a computing entity of a PLC operator or customer. Example identity resources are described further below with reference to identity and access management (IAM) systems.

As used herein, the term "computing entity" refers to a device, component, resource, service, or element within a computing environment such as a cloud computing environment. A computing entity may be implemented as hardware and/or software. A computing entity may perform operations associated with utilizing, building, maintaining, or operating a computing environment and/or services deployed in the computing environment. A computing entity that is implemented as hardware may include one or more of the following: a server, a processor, a memory device, a storage device, or a networking device. A computing entity that is implemented as software may include one or more of the following: an operating system, a cloud management platform, a security platform, a development tool, a compute instance, a virtual machine, a container, a storage system, or a service.

Referring further to FIG. 6A, as shown with reference to partition 604a, a partition 604, such as a source partition, may include one or more source data repositories 606. A source data repository 606 includes one or more source datasets 608, such as source dataset 608a and source dataset 608n. The source datasets 608 are associated with one or more replication tags 610, such as replication tag 610a and replication tag 610n. The replication tags 610 define replication policies for the source dataset 608. In one example, replication tag 610a is mapped to source dataset 608a. Replication tag 610a may define a replication policy for source dataset 608a. Additionally, or alternatively, replication tag 610n may be mapped to source dataset 608n. Replication tag 610n may define a replication policy for source dataset 608n. Example replication tags 610 are further described below with reference to FIGS. 7A-7G.

Referring further to partition 604a, a partition 604, such as a source partition, may include a replication credential repository 612. The replication credential repository 612 may include a set of one or more replication credentials 614, such as replication credential 614a and replication credential 614n. The system 600 may utilize the replication credentials 614 to validate requests to replicate a source dataset 608. Example replication credentials 614 are further described below with reference to FIGS. 8A and 8B.

As further shown with reference to partition 604a, a partition 604, such as a source partition, may include a replication service 616. Additionally, or alternatively, a partition 604, such as a source partition, may include a streaming service 618. The replication service 616 executes operations pertaining to data replication. The replication service 616 may execute operations pertaining to generating replication tags that define replication policies for replicating datasets, for example, as described below with reference to FIGS. 10A and 10B. Additionally, or alternatively, the replication service 616 may execute operations pertaining to evaluating replication tags against replication credentials, for example, as described below with reference to FIGS. 11A and 11B. Additionally, or alternatively, the replication service 616 and/or the streaming service 618 may execute operations pertaining to utilizing replication tags for streaming messages, for example, as described below with reference to FIGS. 12A and 12B.

In one example, a replication service 616 may include one or more of the following: a replication tag generation module 620, a replication request validation module 622, or a data replication agent 624. The replication tag generation module 620 may execute operations pertaining to generating replication tags 610 and associating the replication tags 610 with source datasets 608. The replication request validation module 622 may execute operations pertaining to validating requests to replicate source datasets 608. The data replication agent 624 may execute operations pertaining to replicating a source dataset 608 from a source data repository 606.

As shown with reference to partition 604n, a partition 604, such as a destination partition, may include one or more destination data repositories 626. A destination data repository 626 may include one or more destination datasets 628, such as destination dataset 628a and destination dataset 628n. A source dataset 608 may be replicated to a destination data repository 626, for example, as a destination dataset 628.

In one example, the virtual cloud network includes an IAM system 630. The IAM system includes a framework of policies, processes, and technologies that facilitates the management of digital identities and access permissions for computing entities of the virtual cloud environment 602. The IAM system 630 ensures that the right individuals and computing entities have the appropriate access to resources at the right times and for the right reasons. The IAM system 630 includes a set of identity resources 632, such as identity resource 632a and identity resource 632n. Additionally, the IAM system 630 includes an access policy database 634. The identity resources 632 are entities that can be granted permissions to access and interact with other resources of the virtual cloud network 602. The permissions are defined by access policies in the access policy database 634. The IAM system 630 includes features pertaining to provisioning, deprovisioning, and management of identity resources 632 and access policies associated with the identity resources 632. As examples, identity resources 632 may include one or more of the following: resource principals, service principals, or user principals. A resource principal refers to a specific resource of the virtual cloud network 602 that is given an identity and associated permissions. A service principal refers to a service deployed in the virtual cloud network 602 that is given an identity and associated permissions. A user principal represents a human user within the IAM system. The identity resources 632 may be represented by an identity credential, such as an identity token, issued by the IAM system 630 and provided to the computing entity represented by the identity resource 632.

Referring to FIG. 6B, features of example systems 600 are further described. As shown in FIG. 6B, the virtual cloud network 602 includes a set of partitions 604 and a streaming service 636. The set of partitions 604 include one or more source partitions 638, such as source partition 638a and source partition 638n. Additionally, the set of partitions 604 includes one or more destination partitions 640, such as destination partition 640a and destination partition 640n. The source partitions 638 include a source data repository 642 and a data replication agent 644. For example, source partition 638a includes source data repository 642a and data replication agent 644a. Additionally, or alternatively, source partition 638n includes source data repository 642n and data replication agent 644n. The destination partitions include a data update agent 646 and a destination data repository 648. For example, destination partition 640a includes data update agent 646a source data repository 648a. Additionally, or alternatively, destination partition 640n includes data update agent 646n source data repository 648n.

The streaming service 636 streams messages from one or more source data repositories 642 of one or more source partitions 638 to one or more destination data repositories 648 of one or more destination partitions 640. The messages may include change events that represent changes to a source dataset in a source data repository 642. Additionally, the messages may include streaming tags that are utilized to determine destinations for streaming the messages. In one example, a data replication agent 644 determines a change event associated with a dataset. The data replication agent 644 generates a message that includes the change event and the streaming tag. The data replication agent 644 generates the streaming tag based on a replication tag associated with the dataset. The data replication agent 644 directs the message to the streaming service 636. The streaming service receives multiple messages generated by the data replication agents 644. The streaming service determines destinations for streaming the messages based on the streaming tags in the messages. The streaming service directs the messages to one or more data update agents 646. When a data update agent 646 receive a message from the streaming service 636, the data update agent applies the change event in the message to the destination data repository. In one example, streaming service 636 streams one or more messages from source partition 638a to one or more destination partitions 640, such as to destination partition 640a and/or to destination partition 640n. Additionally, or alternatively, streaming service streams one or more messages from source partition 638*n* to one or more destination partitions 640, such as to destination partition 640*a* and/or to destination partition 640*n*.

5. Example Replication Tags

Referring now to FIGS. 7A-7G, example replication tags 700 are further described. One or more features of the example replication tags 700 described herein may be combined, modified, or omitted. In one example, the replication tags 700 described with reference to FIGS. 7A-7G may be implemented and/or utilized by one or more features of the system described with reference to FIGS. 6A and 6B. Additionally, or alternatively, the replication tags 700 may be generated and/or utilized in one or more of the operations described with reference to FIGS. 10A and 10B, FIGS. 11A and 11B, and/or FIGS. 12A and 12B.

A replication tag 700 may be included in a data structure located in metadata associated with a dataset and/or in a data structure located in a data repository. A replication tag 700 may be mapped to a source dataset 702. In one example, a replication tag may include one or more of the following: a tag namespace, a tag key, or a tag value. The tag namespace may represent a logical grouping or category that serves as a container for tag keys and tag values. The tag key may represent an identifier or a name utilized to refer to the tag. The tag value may represent the data or value associated with the tag key.

Figure 7A:
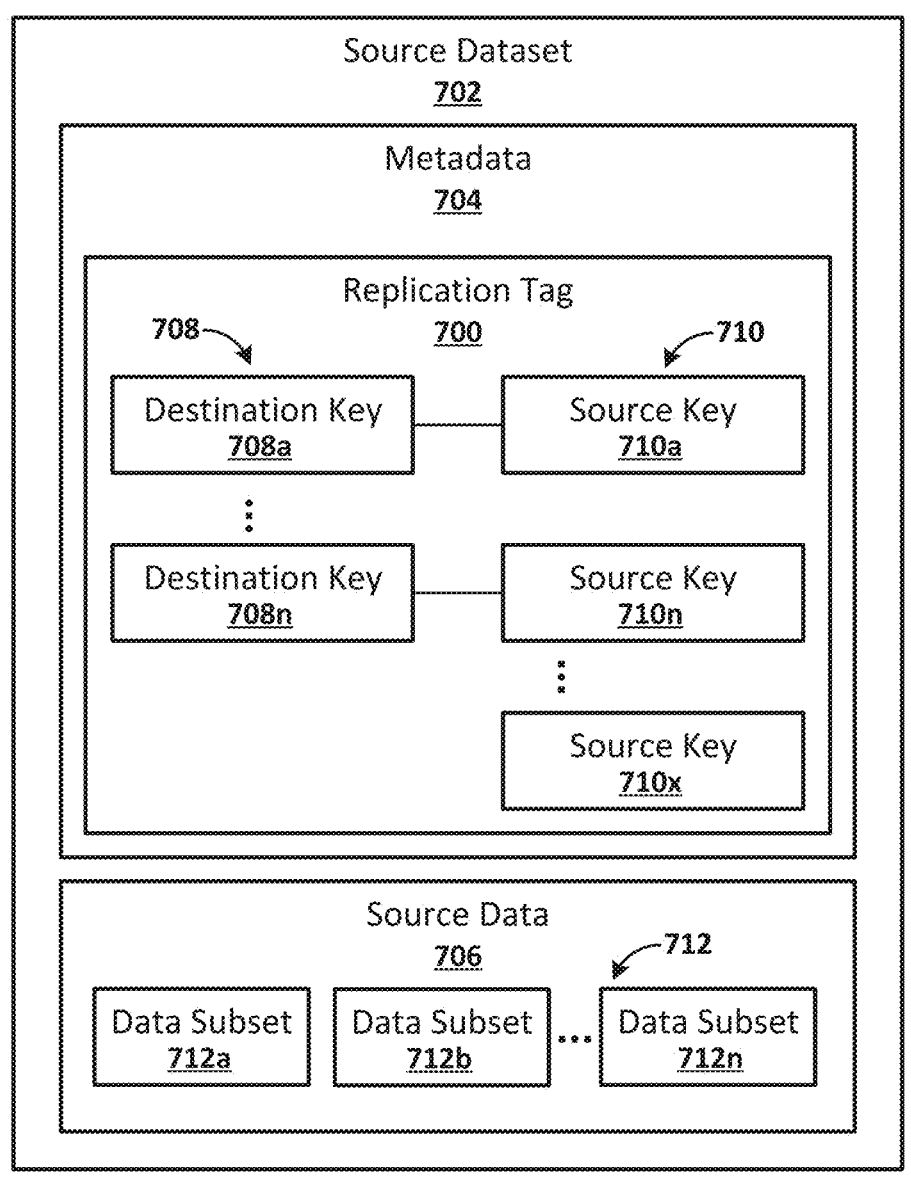
Figure 7B:
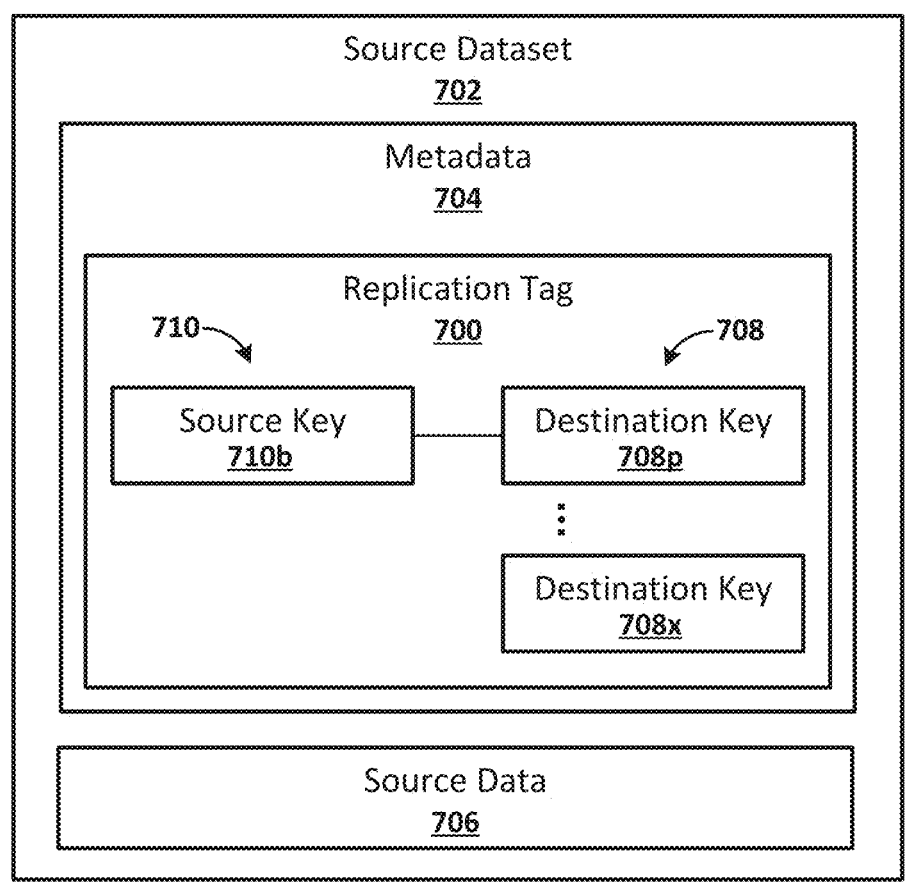

As shown in FIGS. 7A and 7B, in one example, a replication tag 700 associated with a source dataset 702 is included as part of the source dataset 702. In one example, the source dataset 702 includes metadata 704 and source data 706. The metadata 704 is data that provides information about the source dataset 702. The metadata 704 may describe the structure, content, context, or other characteristics of the source dataset 702. The source data 706 of the source dataset 702 includes data values or entries represented by the source dataset 702. The source data 706 may include one or more of the following: files, documents, records, messages, transactions, executable code, objects, logs, cryptographic artifacts, or binary data. The source data 706 may be human readable or machine-readable.

In one example, the metadata 704 includes one or more replication tags 700. A replication tag 700 may include one or more destination keys 708. The data structure of a replication tag 700 may include a mapping of the replication tag 700 to one or more destination keys 708. Additionally, or alternatively, a replication tag 700 may include one or more source keys 710. The data structure of a replication tag 700 may include a mapping of the replication tag 700 to one or more source keys 710. The destination keys 708 and/or the source keys 710 may represent tag values of the replication tags 700.

A destination key 708 identifies a location where the source dataset 702 is allowed to be replicated. The location may be identified by a resource ID or a network address. In one example, a destination key 708 identifies a partition of a cloud environment where the dataset 072 is allowed to be replicated. A source dataset 702 that includes a replication tag 700 with multiple destination keys 708 may be replicated to multiple locations corresponding to the multiple destination keys 708. In one example, referring to FIG. 7A, destination key 708*a* indicates that the source dataset 702 is allowed to be replicated to partition 604*n* (FIG. 6A). Additionally, or alternatively, destination key 708*n* indicates that the source dataset 702 is allowed to be replicated to partition 604*z* (FIG. 6A).

A source key 710 identifies a location of the source dataset 702 that is allowed to be replicated. The location may be identified by a resource ID or a network address. In one example, a source key 710 identifies a partition of a cloud environment where the dataset 072 is allowed to be replicated from. A source dataset 702 that includes a replication tag 700 with multiple source keys 710 indicates that data may be replicated from multiple locations. The data structure of a replication tag 700 may include a mapping of the replication tag 700 to one or more source keys 710. In one example, referring to FIG. 7A, source key 710*a* may indicate that data is allowed to be replicated from partition 604*a* (FIG. 6A). Additionally, or alternatively, source key 710*n* may indicate that data is allowed to be replicated from partition 604*y* (FIG. 6A) and/or source key 710*x* may indicate that data is allowed to be replicated from partition 604*z* (FIG. 6A). In one example, a source key 710 indicates that source dataset 702 is allowed to be replicated, for example, in entirety. Additionally, or alternatively, the source key 710 may indicate that the source data 706 or a portion thereof may be replicated.

Referring to FIG. 7A, the source data 706 of the source dataset 702 may include one or more data subsets 712, such as data subset 712*a*, data subset 712*b*, or data subset 712*n*. In one example, a data subset 712 represents a portion of a dataset. In one example, a data subset 712 is a distinct dataset, such as a self-contained dataset. Accordingly, the contents of the source data 706 may be referred to as a dataset or as a data subset depending on the context. In one example, the data subsets 712 represent data associated with different tenants or customers. In one example, data subsets 712 represent categories or segments of a dataset. In one example, a source key 710 may indicate that a data subset 712 is allowed to be replicated. For example, source key 710*a* may indicate that data subset 712*a* is allowed to be replicated. Additionally, or alternatively, source key 710*n* may indicate that data subset 712*b* is allowed to be replicated and/or source key 710*x* may indicate that data subset 712*n* is allowed to be replicated.

As shown in FIG. 7A, in one example, one or more source keys 710 may be mapped to a destination key 708. For example, the replication tag 700 shown in FIG. 7A includes destination key 708*a* and destination key 708*n*. Further, the replication tag 700 shown in FIG. 7A includes source key 710*a*, source key 710*n*, or source key 710*x*. Source key 710*a* is mapped to destination key 708*a*. Source key 710*n* and source key 100*x* are mapped to destination key 708*n*. The mapping of multiple source keys 710 to a destination key 708 indicates that source data 706 corresponding to multiple sources identified by the multiple source keys 710 can be replicated to a destination corresponding to the destination key 708 in accordance with the replication policy defined by the replication tag 700.

In one example, source key 710*a* identifies partition 604*a* (FIG. 6A) and destination key 708*a* identifies partition 604*n* (FIG. 6A), and the mapping between source key 710*a* and destination key 708*a* indicates that data is allowed to be replicated from partition 604*a* to partition 604*n*. In one example, partition 604*a* is a home partition or a primary partition of a cloud environment and partition 604*n* is a secondary or backup partition of the cloud environment. Partition 604*a* and partition 604*n* may be located in different geographic areas. In one example, partition 604*a* is allocated to a cloud provider and partition 604*n* is allocated to a customer of the cloud provider, such as a tenant or a cloud operator. In one example, source key $710n$ identifies partition $604y$ (FIG. 6A) and destination key $708n$ identifies partition $604n$ (FIG. 6A), and the mapping between source key $710n$ and destination key $708n$ indicates that data is allowed to be replicated from partition $604y$ to partition $604z$. Additionally, or alternatively, source key $710x$ identifies partition $604z$ (FIG. 6A) and the mapping between source key $710x$ and destination key $708n$ indicates that data is allowed to be replicated from partition $604z$ to partition $604n$.

In one example, source key $710a$ identifies data subset $712a$, and the mapping between source key $710a$ and destination key $708a$ indicates that data subset $712a$ is allowed to be replicated to a destination identified by destination key $708a$. Destination key $708a$ may identify a partition of a cloud environment provisioned for customer (A) and data subset $712a$ may contain data specific to customer (A). In one example, source key $710n$ identifies data subset $712b$, and the mapping between source key $710n$ and destination key $708n$ indicates that data subset $712b$ is allowed to be replicated to a destination identified by destination key $708n$. Additionally, or alternatively, source key $710x$ identifies data subset $712n$, and the mapping between source key $710x$ and destination key $708n$ indicates that data subset $712n$ is allowed to be replicated to a destination identified by destination key $708n$. Destination key $708n$ may identify a partition of a cloud environment provisioned for customer (N) and data subset $712b$ and data subset $712n$ may contain data specific to customer (N). Data subset $712b$ may be associated with a first service of a cloud environment utilized by customer (N), and data subset $712n$ may be associated with a second service of the cloud environment utilized by customer (N). Additionally, or alternatively, data subset $712b$ may be associated with a first asset of customer (N), and data subset $712n$ may be associated with a second asset of customer (N).

As shown in FIG. 7B, in one example, one or more destination keys $708$ may be mapped to a source key $710$. For example, the replication tag $700$ shown in FIG. 7B includes destination key $708p$ and destination key $708x$ mapped to source key $710b$. The mapping of multiple destination keys $708$ to a source key $710$ indicates that source data $706$ corresponding to the source key $710$ can be replicated to multiple destinations corresponding to the multiple destination keys $708$ in accordance with the replication policy defined by the replication tag $700$.

In one example, source key $710b$ identifies partition $604a$ (FIG. 6A). In one example, destination key $708p$ identifies partition $604n$ (FIG. 6A). In one example, destination key $708x$ identifies partition $604y$ (FIG. 6A). The mapping of destination key $708b$ and destination key $708x$ to source key $710b$ indicates that data is allowed to be replicated from partition $604a$ to partition $604n$ and to partition $604y$. In one example, partition $604a$ is a home partition or a primary partition of a cloud environment and partition $604n$ and partition $604y$ are secondary or backup partitions of the cloud environment. Partition $604a$, partition $604n$, and partition $604y$ may be located in different geographic areas. In one example, partition $604a$ is allocated to a cloud provider and partition $604n$ and partition $604y$ are allocated to a customer of the cloud provider, such as a tenant or a cloud operator. Partition $604n$ and partition $604y$ may be allocated to the same customer or to different customers.

Referring to FIGS. 7C-7F, example replication tags $700$ are further described. In one example, a shown in FIGS. 7C-7E, a replication tag $700$ may include a tag key $714$. The tag key $714$ may identify the replication tag $700$. In one example, referring to FIG. 7D, the tag key $714$ includes one or more destination keys $708$. In one example, the replication tag $700$ may be identified by a destination key $708$. In one example, the destination key $708$ is the tag key $714$. In one example, referring to FIG. 7E, the tag key $714$ includes one or more source keys $710$. In one example, the replication tag $700$ may be identified by a source key $710$. In one example, the source key $710$ is the tag key $714$. Additionally, or alternatively, in one example, the tag key $714$ is the replication tag $700$.

Figure 7C:
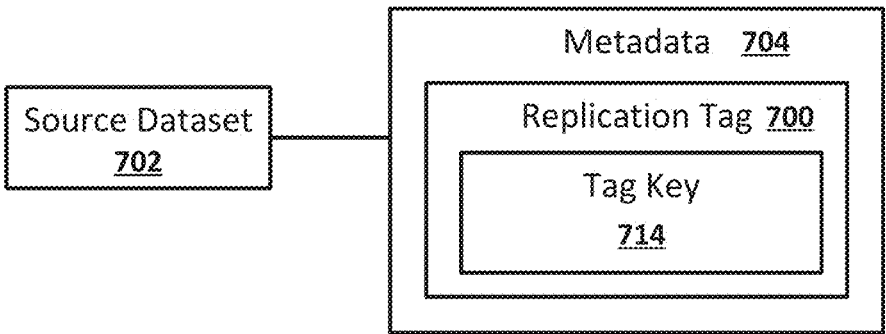
Figure 7D:
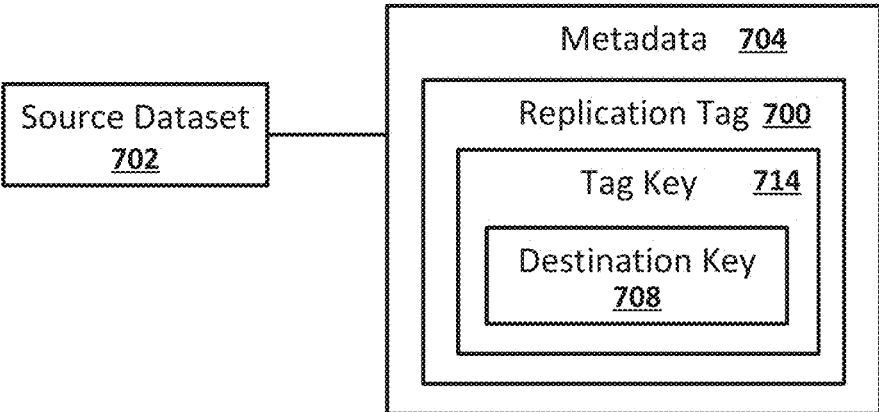
Figure 7E:
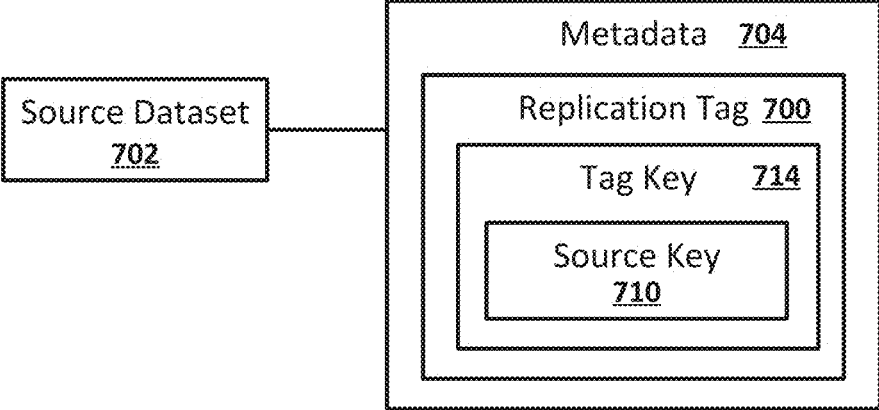

As shown in FIGS. 7C-7E, a replication tag $700$ is associated with a source dataset $702$. For example, the replication tag $700$ may be stored in metadata $704$ associated with the source dataset $702$. Different replication tags $700$ associated with different source datasets $702$ may respectively include a tag key $714$, such as a tag key $714$. In one example, replication tags $700$ for different source datasets $702$ may utilize the same destination key $708$, for example, to refer to the same destination where the different source datasets $702$ are allowed to be replicated. Additionally, or alternatively, replication tags $700$ may utilize the same source key $710$, for example, when data is allowed to be replicated from the same source dataset $702$ to different destinations.

Figure 7F:
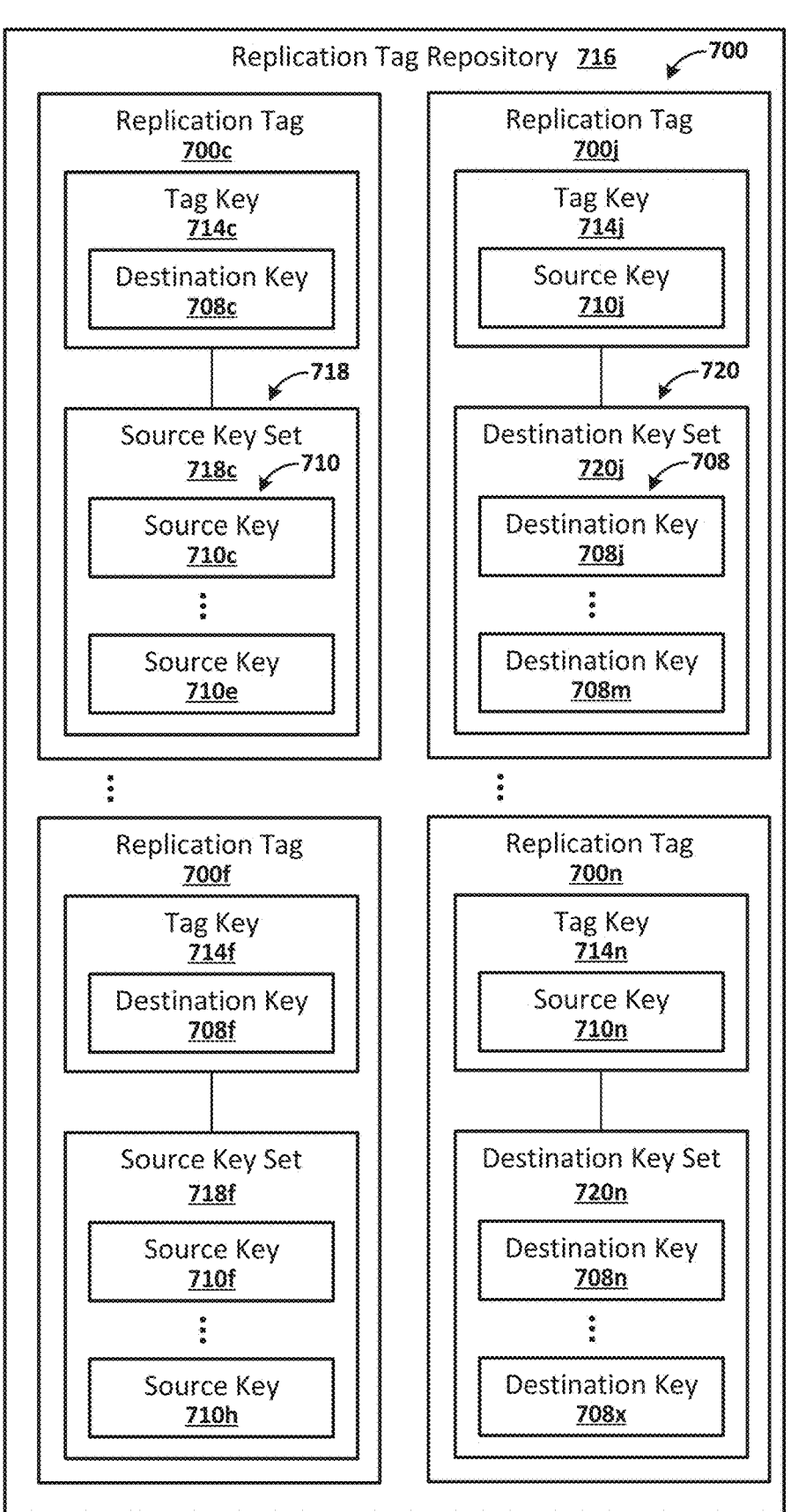

Referring to FIG. 7F, one or more replication tags $700$ may be stored at least in part in a replication tag repository $716$. In one example, a replication tag repository $716$ may be utilized to store replication tags that include multiple source keys $710$ and/or multiple destination keys $708$. The replication tag repository $716$ may avoid storing relatively large replication tags in metadata $704$ associated with source datasets $702$ (FIGS. 7C-7E). A replication tag $700$ stored in a replication tag repository $716$ may be mapped to a source dataset $702$ by a tag key $714$ (FIGS. 7C-7E). Additionally, or alternatively, a tag key $714$ may map the source dataset $702$ to the replication tag repository $716$, such as to a location of a replication tag $700$ in the replication tag repository $716$. In one example, as shown in FIGS. 7C-7E, a first portion of a replication tag $700$ may be located in metadata $704$ associated with a source dataset $702$, and as shown in FIG. 7F, a second portion of a replication tag $700$ may be located in a replication tag repository $716$. In one example, a tag key $714$ located in metadata $704$, such as a tag key $714$ of a replication tag $700$ located in metadata $704$, includes a pointer that points to a replication tag $700$ in a data structure that is external to the metadata $704$. In one example, the pointer points to a replication tag $700$ located in the replication tag repository $716$. Additionally, or alternatively, the pointer may point to a tag key $714$ of a replication tag $700$ in the replication tag repository $716$. Additionally, or alternatively, the pointer may point to a destination key $708$ or a source key $710$ of a replication tag $700$ in the replication tag repository $716$. Additionally, or alternatively, a replication tag $700$ may be located in its entirety in a replication tag repository $716$, and the replication tag $700$ may be mapped to the source dataset $702$ by an identifier, such as a tag key $714$ that is not considered part of the replication tag $700$.

As shown in FIG. 7F, a replication tag repository $716$ may include a set of replication tags $700$, such as replication tag $700c$, replication tag $700r$, replication tag $700j$, and replication tag $700n$. In one example, as depicted by replication tag $700c$ and replication tag $700r$, one or more replication tags $700$ in the replication tag repository $716$ may include a tag key $714$ and a source key set $718$ mapped to the tag key $714$. The source key set $718$ includes a set of one or more source keys 710. Replication tag 700c includes tag key 714c. In one example, tag key 714c corresponds to a tag key 714 stored in metadata 704 associated with a source dataset 702 (e.g., FIG. 7D). Tag key 714c includes destination key 708c. Additionally, or alternatively, destination key 708c may serve as the tag key 714c. The tag key 714c is mapped to source key set 718c. Source key set 718c includes source key 710c and source key 710c. Replication tag 700c includes tag key 714f. In one example, tag key 714f corresponds to a tag key 714 stored in metadata 704 associated with a source dataset 702 (e.g., FIG. 7D). Tag key 714f includes destination key 708f. Additionally, or alternatively, destination key 708f may serve as the tag key 714f. The tag key 714f is mapped to source key set 718f. Source key set 718f includes source key 710r and source key 710h.

In one example, as depicted by replication tag 700j and replication tag 700n, one or more replication tags 700 in the replication tag repository 716 may include a tag key 714 and a destination key set 720 mapped to the tag key 714. The destination key set 720 includes a set of one or more destination keys 708. Replication tag 700j includes tag key 714j. In one example, tag key 714j corresponds to a tag key 714 stored in metadata 704 associated with a source dataset 702 (e.g., FIG. 7E). Tag key 714j includes source key 710j. Additionally, or alternatively, source key 710j may serve as the tag key 714j. The tag key 714j is mapped to destination key set 720j. Destination key set 720j includes destination key 708j and destination key 708m. Replication tag 700m includes tag key 714m. In one example, tag key 714m corresponds to a tag key 714 stored in metadata 704 associated with a source dataset 702 (e.g., FIG. 7E). Tag key 714n includes source key 710n. Additionally, or alternatively, source key 710n may serve as the tag key 714n. The tag key 714n is mapped to destination key set 720n. Destination key set 720n includes destination key 708n and destination key 708x.

Referring to FIG. 7G, replication tags 700 are further described. As shown in FIG. 7G, replication tags 700 may be located in metadata 704 associated with source dataset 702. For example, as shown in FIG. 7G, the metadata 704 may include replication tag 700r, replication tag 700s, and replication tag 700h. One or more replication tags 700 may be associated with a data source, such as source data 706r. For example, replication tag 700r is associated with source data 706r. Replication tag 700r includes destination key 708r. In one example, replication tag 700r may include tag key 714r. In one example, tag key 714r may include destination key 708r. Additionally, or alternatively, destination key 708r may serve as the tag key 714r. Replication tag 700r may be mapped to destination key 708r, for example by tag key 714r. Additionally, or alternatively, replication tag 700r may be mapped to a source key 710, for example, by tag key 714r.

As another example, replication tag 700s is associated with source data 706s. Replication tag 700s includes destination key 708s and source key set 718s. Destination key 708s is mapped to source key set 718s. Source key set 718s includes source key 710s and source key 710v. In one example, replication tag 700s may include tag key 714s. As yet another example, replication tag 700t is associated with source data 706t. In one example, replication tag 700t includes destination key 708t and source key set 718t. Destination key 708t is mapped to source key set 718t. Source key set 718t includes source key 710t and source key 710w. Additionally, or alternatively, replication tag 700t may include destination key 708u and source key set 718u. Destination key 708u is mapped to source key set 718u.

Source key set 718u includes source key 710u and source key 710z. In one example, replication tag 700t may include tag key 714t. Tag key 714t may be mapped to destination key 708t and/or destination key 708u. Additionally, or alternatively, tag key 714t may be mapped to one or more source keys 708, and the one or more source keys may be mapped to a destination key set 720 (FIG. 7F).

6. Example Replication Credentials

Figure 8A:
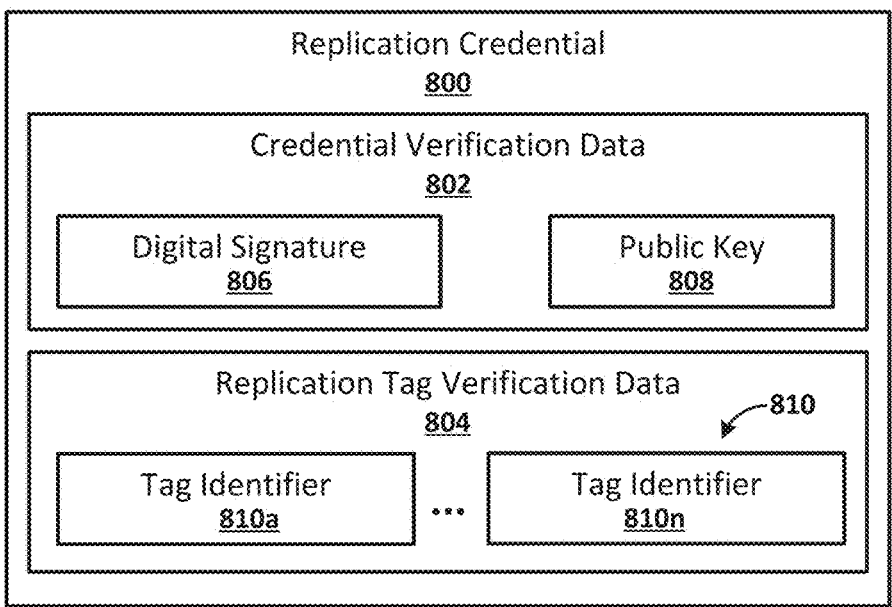
FIGS. 8A and 8B schematically depict example replication credentials in accordance with one or more embodiments.
Figure 8B:
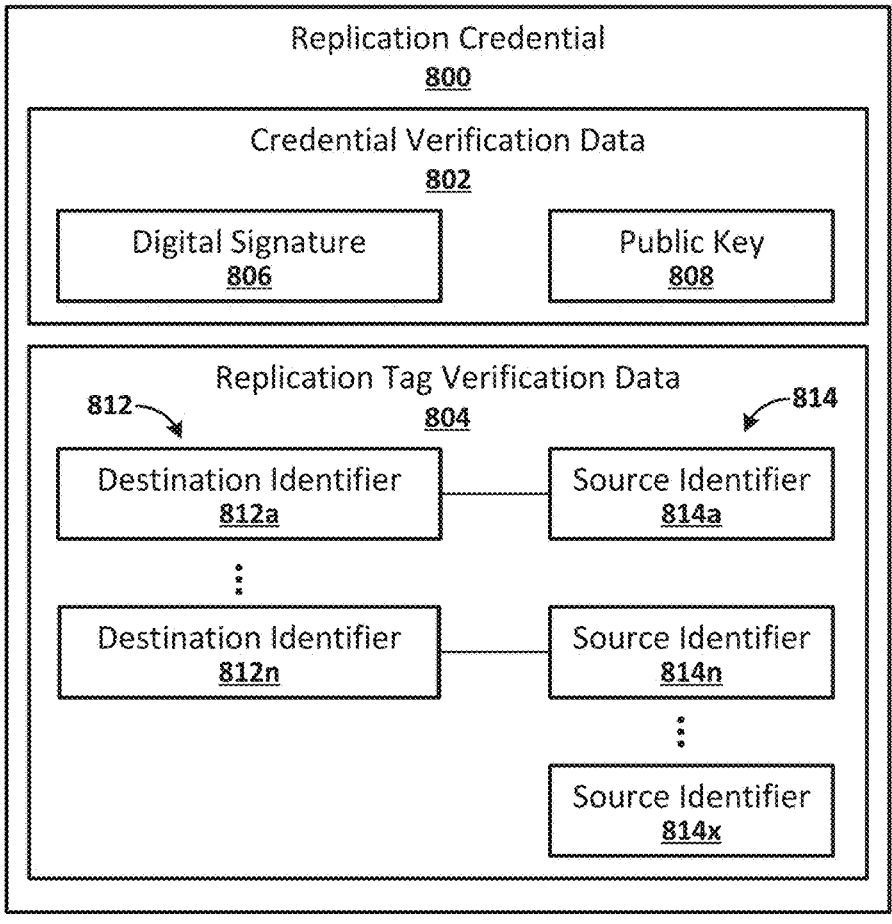

Referring now to FIGS. 8A and 8B, example replication credentials are further described. One or more features of the example replication credentials described herein may be combined, modified, or omitted. In one example, the replication credentials described with reference to FIGS. 8A and 8B may be implemented and/or utilized by one or more features of the system described with reference to FIGS. 6A and 6B. Additionally, or alternatively, the replication credentials described with reference to FIGS. 8A and 8B may be generated and/or utilized in one or more of the operations described with reference to FIGS. 10A and 10B, FIGS. 11A and 11B, and/or FIGS. 12A and 12B.

As shown in FIGS. 8A and 8B, a replication credential 800 may include credential verification data 802 and/or replication tag verification data 804. The credential verification data 802 may be utilized to validate the replication credential 800. Additionally, or alternatively, the credential verification data 802 may be utilized to validate replication requests that are accompanied by the replication credential 800. In one example, the credential verification data includes a digital signature 806. The digital signature 806 may be generated by an issuer of the replication credential 800. The digital signature 806 may be validated using a public key corresponding to a private key of the issuer that was utilized to generate the digital signature 806. The public key of the issuer may be generally available to computing entities that verify replication credentials 800 issued by the issuer. In one example, the credential verification data 802 includes a public key 808. The public key 808 may correspond to a private key associated with the replication credential 800. The private key associated with the replication credential may be held by a computing entity that transmits replication requests accompanied by the replication credential 800. The computing entity may digitally sign the requests with the private key. A computing entity that receives the request may validate the digital signature using the public key 808.

In one example, as shown in FIG. 8A, the replication tag verification data 804 may include one or more tag identifiers 810, such as tag identifier 810a and tag identifier 810n. A tag identifier 810 may be utilized to verify a replication tag associated with the replication credential 800. In one example, a tag identifier 810 in a replication credential 800 corresponds to a tag key of a replication tag. In one example, the tag identifier 810 is a copy of the tag key. A valid replication tag may include a tag key that corresponds to a tag identifier 810 of a replication credential 800. A replication tag identified by a tag identifier 810 in the replication credential 800 represents authorization to replicate a dataset associated with the replication tag in accordance with an access policy defined by the replication tag. In one example, tag identifier 810a of the replication credential 800 represents authorization to replicate a first dataset associated with a first replication tag identified by tag identifier 810a in accordance with a first access policy defined by the first replication tag. Additionally, or alternatively, tag identifier 810n of the replication credential 800 represents authorization to replicate a second dataset associated with a second replication tag identified by tag identifier 810n in accordance with a second access policy defined by the second replication tag.

In one example, as shown in FIG. 8B, the replication tag verification data 804 may include one or more destination identifiers 812, such as destination identifier 812a and destination identifier 812n. A destination identifier 812 may be utilized to identify a destination key of a replication tag associated with the replication credential 800. Additionally, or alternatively, the replication tag verification data 804 may include one or more source identifiers 814, such as source identifier 814a, source identifier 814n, and source identifier 814z. A source identifier 814 may be utilized to identify a source key of a replication tag associated with the replication credential 800. One or more source identifiers 814 may be mapped to a destination identifier 812. For example, as shown in FIG. 8B, source identifier 814a is mapped to a destination identifier 812a. Additionally, as shown in FIG. 8B, source identifier 814n and source identifier 814x are mapped to destination identifier 812n. Additionally, or alternatively, one or more destination identifiers 812 may be mapped to a source identifier 814.

A destination identifier 812 in a replication credential 800 may be utilized to verify a replication tag, and/or a destination key of a replication tag, associated with the replication credential 800. In one example, a destination identifier 812 in the replication credential 800 corresponds to a destination key of the replication tag. In one example, the destination identifier 812 is a copy of the destination key. A valid replication tag may include a destination key that corresponds to a destination identifier 812 of a replication credential 800. A destination key of a replication tag identified by a destination identifier 812 in the replication credential 800 represents authorization to replicate a dataset associated with the replication tag to a destination corresponding to the destination key of the destination tag in accordance with an access policy defined by the replication tag.

A source identifier 814 in a replication credential 800 may be utilized to verify a replication tag, and/or a source key of a replication tag, associated with the replication credential 800. In one example, a source identifier 814 in the replication credential 800 corresponds to a source key of a replication tag. In one example, the source identifier 814 is a copy of the destination key. A valid replication tag may include a source key that corresponds to a source identifier 814 of a replication credential 800. A source key of a replication tag identified by a source identifier 814 in the replication credential 800 represents authorization to replicate a dataset associated with the replication tag from a source corresponding to the source key of the source tag in accordance with an access policy defined by the replication tag.

In one example, source identifier 814a mapped to destination identifier 812a represents authorization to replicate a first dataset associated with a first replication tag from a first source identified by a first source key of the first replication tag corresponding to source identifier 814a to a first destination identified by a first destination key of the first replication tag corresponding to destination identifier 812a. Additionally, or alternatively, source identifier 814n mapped to destination identifier 812n represents authorization to replicate a second dataset associated with a second replication tag from a second source identified by a second source key of the second replication tag corresponding to source identifier 814n to a second destination identified by a second destination key of the second replication tag corresponding to destination identifier 812n. Additionally, or alternatively, source identifier 814x mapped to destination identifier 812n represents authorization to replicate a third dataset associated with the second replication tag from a third source identified by a third source key of the second replication tag corresponding to source identifier 814x to the second destination identified by the second destination key of the second replication tag corresponding to destination identifier 812n.

7. Example Change Events and Messages for Streaming Change Events to Replicate Datasets Referring now to FIGS. 9A-9C, example change events, messages for streaming change events to replicate datasets, and message streams that include a set of messages are further described. Example change events are described with reference to FIG. 9A. Example messages for replicating change events are described with reference to FIG. 9B. Example message streams that include a stream of messages for replicating change events are described with reference to FIG. 9C. One or more features described with reference to FIGS. 9A-9C may be combined, modified, or omitted. In one example, the features described with reference to FIGS. 9a-9C may be implemented and/or utilized by one or more features of the system described with reference to FIGS. 6A and 6B. Additionally, or alternatively, the change events, messages, and message streams described with reference to FIGS. 9A-9C may be generated and/or utilized in one or more of the operations described with reference to FIGS. 10A and 10B, FIGS. 11A and 11B, and/or FIGS. 12A and 12B.

Figure 9A:
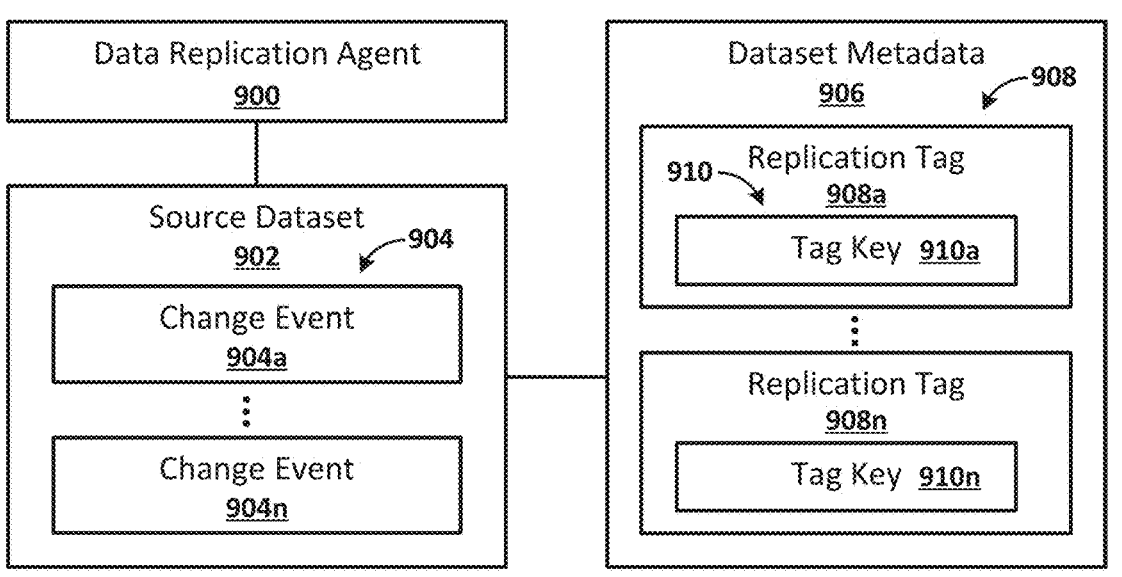
FIG. 9A schematically depicts a set of change events corresponding to a source dataset associated with a set of one or more replication tags in accordance with one or more embodiments.

As shown in FIG. 9A, a data replication agent 900 is associated with a source dataset 902. A system may include multiple source datasets 902. A data replication agent 900 may be associated with one or more source datasets 902. In one example, a first data replication agent 900 is associated with a first source dataset 902 and a second data replication agent 900 is associated with a second source dataset 902. The data replication agent 900 identifies change events 904 to the source dataset. As an example, source dataset 902 includes change event 904a and change event 904n. A change event 904 may include data being added, deleted, or modified. Additionally, or alternatively, a change event 904 may include one or more of the following: a new record being added to the source dataset 902, an existing record of the source dataset 902 being modified, a record being removed from the source dataset 902, an alteration to a structure or schema of the source dataset 902, or a change to a permission or an access control associated with the source dataset 902. The change event 904 may include a discrete change and/or a bulk operation such as data migrations.

Dataset metadata 906 is associated with source dataset 902. The dataset metadata 906 may include a set of one or more replication tags 908, such as replication tag 908a and replication tag 908n. The replication tags 908 include a tag key 910. For example, replication tag 908a includes tag key 910a and replication tag 908n includes tag key 910n. The replication tags 908 may be configured as described above, for example, with reference to FIGS. 7A-7G. Additionally, or alternatively the source dataset 902 may be associated with a replication tag repository (not shown) that includes one or more replication tags 908 that are associated with the source dataset 902. The replication tag repository may be configured as described above, for example, with reference to FIG. 7F.

Figure 9B:
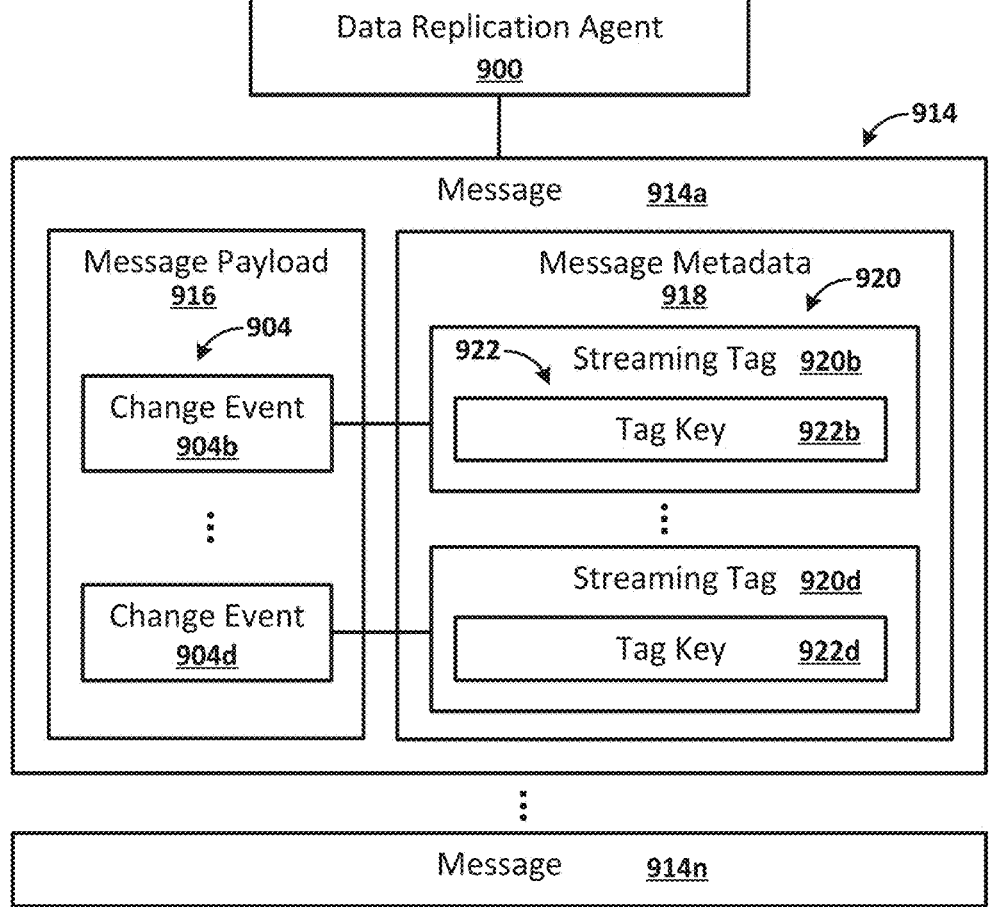
FIG. 9B schematically depicts an example message for streaming a set of one or more change events corresponding to a source dataset to a set of one or more destinations determined based on a set of one or more replication tags associated with the source dataset set in accordance with one or more embodiments.

Referring to FIG. 9B, a data replication agent 900 generates messages 914. The data replication agent 900 may generate the messages 914 in response to detecting change events 904. As shown in FIG. 9B, data replication agent 900 has generated message 914a and message 914n. The data replication agent 900 may generate a messages 914 for a particular change event 904. Additionally, or alternatively, data replication agent 900 may include multiple change events 904 in a particular message 914.

As shown with reference to message 914a, the messages 914 include a message payload 916 and message metadata 918. The message payload includes one or more change events 904. For example, as shown in FIG. 9B, the message payload 916 of message 914a includes change event 904b and change event 904d. The message metadata 918 includes one or more streaming tags 920, such as streaming tag 920b and streaming tag 920d. The streaming tags 920 are mapped to one or more change events 904. For example, as shown in FIG. 9B, streaming tag 920b is mapped to change event 904b and streaming tag 920d is mapped to change event 904d.

In one example, a streaming tag 920 includes a copy of a replication tag associated with the source dataset 902 (FIG. 8A) corresponding to the change event 904. Additionally, or alternatively, a streaming tag 920 may include information determined from a replication tag, such as one or more tag keys, one or more source keys, and/or one or more destination keys from a replication tag. In one example, the streaming tags 920 include one or more tag keys 922. For example, as shown in FIG. 9B, streaming tag 920b includes tag key 922b and streaming tag 920d includes tag key 922d. The tag key 922 of a streaming tag 920 identifies the streaming tag 920. Additionally, or alternatively, the tag key 922 may identify a replication tag (not shown) corresponding to the streaming tag 922. In one example, the tag key 922 of a streaming tag 920 may match a tag key of a replication tag. In one example, the tag key 922 includes a source key determined from a replication tag. In one example, the source key determined from the replication tag is the tag key 922 of the streaming tag. Additionally, or alternatively, the tag key 922 may include a destination key determined from a replication tag. The system may determine one or more destinations for streaming a message 914 to replicate the one or more change events 904 in the message based on the streaming tag 920 and/or the tag key 922.

Figure 9C:
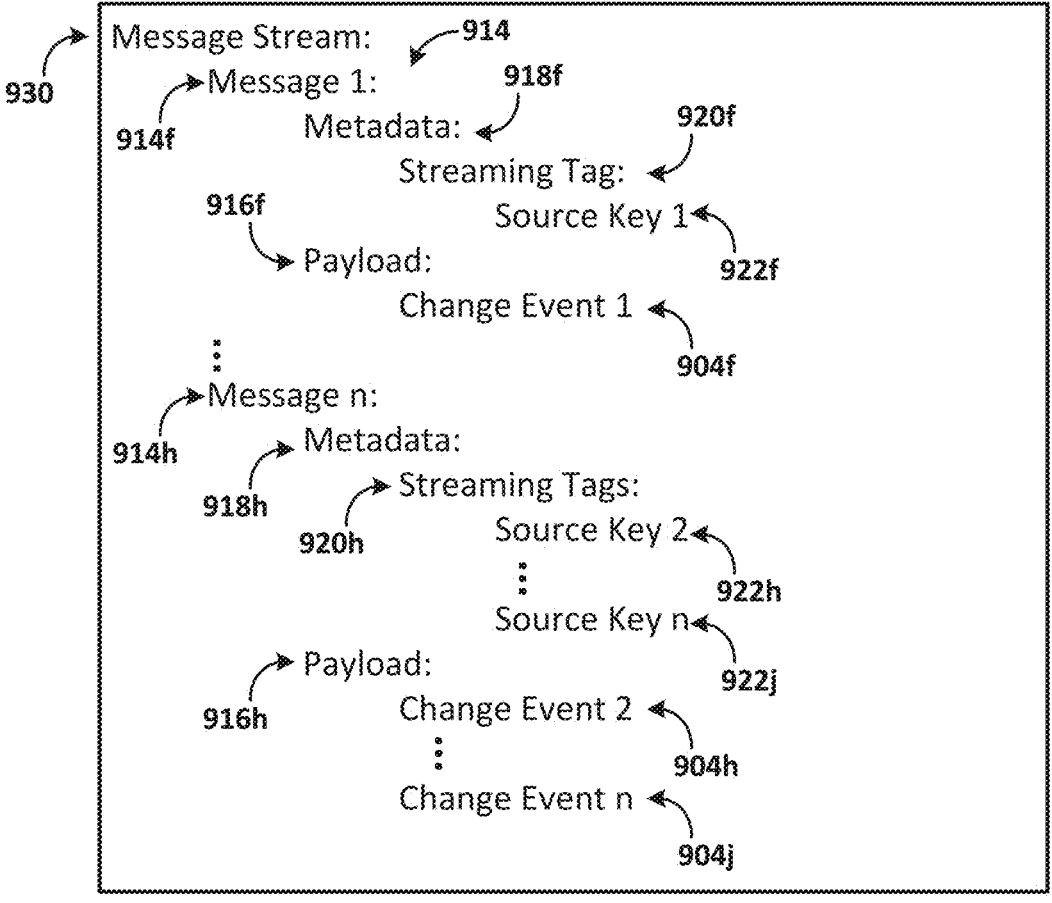
FIG. 9C schematically depicts an example message stream that includes a set of messages to be streamed to a set of one or more destinations in accordance with one or more embodiments.

Referring to FIG. 9C, example message streams are further described. As shown in FIG. 9C, a message stream 930 includes a set of one or more messages 914, such as message 914f and message 914h. Message 914f includes payload 916f and metadata 918f. Payload 916f includes change event 904f. Metadata 918f includes streaming tag 920f. Streaming tags 920f includes source key 924f. Message 914h includes payload 916h and metadata 918h. Payload 916h includes multiple change events 904, such as change event 904h and change event 904j. Metadata 918f includes multiple streaming tags 920h. The streaming tag 920h include source key 924h and source key 924j. Additionally, or alternatively, the streaming tags may include one or more tag keys and/or one or more destination keys. A streaming service may determine one or more destinations for replicating the change events based on a mapping of the source keys 924 to one or more destination keys. In one example, the streaming service may determine the one or more destination keys based on a mapping of a source key 924 of a streaming tag 920 to a replication tag that includes the one or more destination keys. In one example, the streaming system maps the source key 924 of the streaming tag 920 to a source key of the replication tag that is mapped to the one or more destination keys.

8. Example Operations for Generating and Utilizing Replication Tags

Referring now to FIGS. 10A and 10B, FIGS. 11A and 11B, and FIGS. 12A and 12B, example operations pertaining to generating and utilizing replication tags are further described. One or more operations described with reference to FIGS. 10A and 10B, FIGS. 11A and 11B, and FIGS. 12A and 12B may be modified, rearranged, or omitted. Accordingly, the particular sequence of operations described with reference to FIGS. 10A and 10B, FIGS. 11A and 11B, and FIGS. 12A and 12B should not be construed as limiting the scope of one or more embodiments. In one example, the operations described with reference to FIGS. 10A and 10B, FIGS. 11A and 11B, and FIGS. 12A and 12B may be performed by one or more features of the system described with reference to FIGS. 6A and 6B.

A. Generating and Utilizing Replication Tags to Define Replication Policies

Figure 10B:
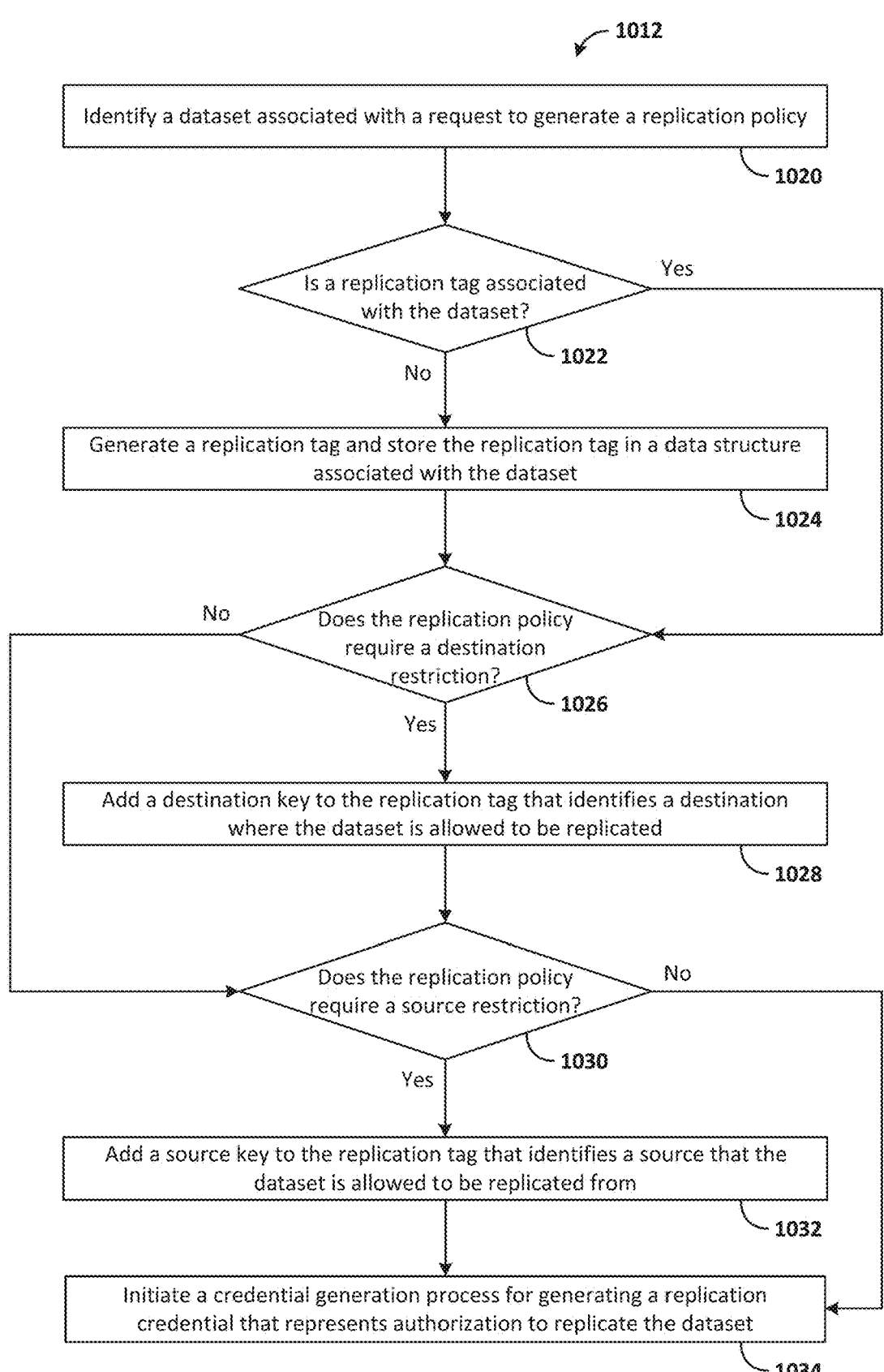

Referring now to FIGS. 10A and 10B, operations 1000 pertaining to generating replication tags that define replication policies for replicating datasets are further described. As described with reference to FIGS. 10A and 10B, to define a replication policy for a dataset, the system associates the dataset with a replication tag that identifies one or more locations where the dataset is allowed to be replicated. Additionally, or alternatively, the replication tag may define one or more sources of a dataset that is allowed to be replicated.

As shown in FIG. 10A, a system receives a request to generate a replication policy that allows replication of a dataset to a destination of a cloud environment (Operation 1002). The replication policy may allow replication of the dataset from a source data repository located in a source partition of the cloud environment to a destination data repository located in a destination partition of the cloud environment. The system may receive the request from an operator device interface. Additionally, or alternatively, the system may receive the request from a data replication agent. The data replication agent may generate the request in response to an input from the operator device interface. Additionally, or alternatively, the data replication agent may generate the request in response to a trigger condition. The trigger condition may include an operational state of a cloud environment. In one example, the trigger condition includes a determination by the data replication agent that a dataset is available that meets a set of criteria for replication. The criteria for replication may include a location of the dataset or one or more parameters of the dataset. Additionally, or alternative, the trigger condition may include a determination by the data replication agent that a destination data repository is available to receive replication data. In one example, the system instantiates a destination data repository to receive replication data and upon having instantiated the destination data repository, the system initiates a request to generate a replication policy that allows replication of a dataset to the destination data repository.

In one example, the system determines a location of the dataset and/or a location of a computing entity that initiated the request to generate the replication policy for the dataset (Operation 1004). In one example, an access policy applicable to a dataset may require that the dataset be located in an authorized location for a replication policy to be generated for the dataset. Additionally, or alternatively, an access policy may require that a request to generate a replication policy for a dataset be initiated from an authorized location. The system may determine the location of the dataset based on a network address or a network ID of the data repository where the dataset is stored. The system may determine the location of the computing entity based on a network address or a network ID of the computing entity. Additionally, or alternatively, the system may determine the location of the dataset based on geolocation mapping between a network address or network ID and a geographical location.

Upon having the determined the location of the dataset and/or the computing entity that initiated the request to generate the replication policy, the system determines whether the dataset and/or the computing entity are located in an authorized location for generating the replication policy (Operation 1006). When an access policy requires that the dataset be located in an authorized location for a replication policy to be generated for the dataset, the system determines whether the location of the dataset is an authorized location for a replication policy to be generated for the dataset. In one example, the system may determine whether the location of the dataset is an authorized location for the replication policy to be generated for the dataset based on metadata associated with the dataset and/or the data repository where the dataset is located. The metadata may include a parameter that defines whether the location is authorized for generating the replication policy. Additionally, or alternatively, the system may determine whether the location of the dataset is an authorized location for the replication policy to be generated for the dataset based on one or more access policies for the dataset and/or the data repository where the dataset is located. The one or more access policies may be defined by an IAM system. When the system determines that the dataset is not located in an authorized location for generating the replication policy, the system rejects the request to generate the replication policy.

When an access policy requires that the request to generate the replication policy for the dataset be initiated from a computing entity located at an authorized location, the system determines whether the computing entity that initiated the request is located at an authorized location. The system may determine whether the computing entity that initiated the request is located at an authorized location based on one or more access policies for the computing entity. The one or more access policies may be defined by an IAM system. Additionally, or alternatively, the access policy may require that a computing entity that initiates a request to replicate a dataset be located in the same partition of a cloud environment as a data repository where the dataset is located. When the system determines that the computing entity is not located in an authorized location for initiating the request to generate the replication policy, the system rejects the request to generate the replication policy.

When the system determines that the dataset and the computing entity are located in an authorized location for generating the replication policy, as applicable in accordance with the access policy, the system proceeds with the operations 1000 for generating the replication policy. In one example, an access policy requires that a computing entity that initiates a request to generate a replication policy for a dataset be located in the same partition of a cloud environment as a data repository where the dataset is located. The system receives a first request to generate a replication policy for a dataset located in a source partition of a cloud environment that would allow replication of the dataset to a destination data repository located in a destination partition of the cloud environment. The system determines that the first request was initiated by a computing entity located in the destination partition. The destination partition is a different partition than the source partition. The destination partition is a location external to the source partition. Based on the data repository and the computing entity that initiated the first request being located in different partitions and/or based on the request being initiated from a location external to the source partition, the system rejects the request to generate the replication policy. Additionally, or alternatively, the system receives a second request to generate the replication policy for the dataset. The system determines that the second request was initiated by a computing entity located in the source partition. Based on the data repository and the computing entity that initiated the second request being located in the same partition, the system proceeds with the operations 1000 for generating the replication policy.

In one example, the system verifies one or more identity resources associated with the request to generate the replication policy against one or more access policies associated with the identity resource (Operation 1008). The one or more identity resources may be associated with a computing entity that initiated the request to generate the replication policy. Additionally, or alternatively, the one or more identity resources may be associated with an operator that utilized the computing entity to initiate the request to generate the replication policy. Additionally, or alternatively, the one or more identity resources may be associated with the dataset and/or the data repository where the dataset is located. The one or more identity resources may be represented by an identity credential, such as an identity token. The identity credential may be presented in connection with the request to generate the replication policy. The one or more access policies may be defined by an IAM system. The system may verify the identity resource against one or more access policies by validating the identity credential, such as the identity token, representing the identity resource. Additionally, or alternatively, the system may transmit a verification request to the IAM system and the IAM system may verify the one or more identity resources against one or more access policies associated with the identity resource.

Based at least on verifying the one or more identity resources against the one or more access polices, the system determines whether the one or more access policies associated with the identity resource allow generation of a replication policy for the dataset (Operation 1010). When the system determines that one or more access policies associated with the identity resource do not allow generation of a replication policy for the dataset, the system rejects the request to generate the replication policy. When the system determines that one or more access policies associated with the identity resource allow generation of a replication policy for the dataset, the system proceeds with the operations 1000 for generating the replication policy.

The system generates the replication policy for the dataset (Operation 1012). In one example, the system generates the replication policy by associating the dataset with a replication tag that defines the replication policy for the dataset. Additionally, or alternatively, the system may further generate the replication policy by initiating a credential generation process for generating a replication credential that represents authorization to replicate the dataset in accordance with the replication policy defined by the replication tag. The system may generate one or more replication policies for replicating a dataset to one or more destinations, such as to one or more destination partitions of a cloud environment. Operations pertaining to generating replication policies for datasets are further described below with reference to FIG. 10B.

Upon having generated the replication policy, the system maintains a set of executable instructions that implement the replication policy (Operation 1014). In one example, the executable instructions allow replication of a dataset to a destination, such as to a destination partition of a cloud environment, contingent at least upon verifying a replication credential, associated with a replication request to replicate the dataset to the partition, against a replication tag associated with the dataset.

In one example, the system replicates the dataset on one or more occasions. Operations pertaining to evaluating replication credentials against replication tags to determine whether to grant replication requests are further described below with reference to FIGS. 11A and 11B.

In one example, the system receives a request to stop replication of the dataset. The request to stop replicating the dataset may pertain to all or a portion of a replication policy defined by a replication tag. In one example, the request to stop replication of the dataset applies to a full scope of a replication policy defined by a replication tag associated with the dataset. In response to a request to stop replicating the dataset that is applicable to the full scope of a replication policy, the system deletes the replication policy by deleting the replication tag and/or the system augments the replication policy by removing the association between the replication tag and the dataset. In one example, the request to stop replication of the dataset applies to a partial scope of a replication policy defined by a replication tag associated with the dataset. For example, the request may be to stop replicating to a first destination, such as to a first destination partition of a cloud environment. An additional portion of the replication policy defined by the replication tag may allow replication of the dataset to a second destination, such as to a second destination partition of the cloud environment. In response to a request to stop replicating the dataset that is applicable to a partial scope of a replication policy, such as a request to stop replicating to the first destination, the system augments the replication policy to stop replication of the dataset to the first destination, at least by removing an association between the dataset and the first destination defined by the replication tag. The portion of the replication policy that allows replication of the dataset to the second destination may be unaffected by the request to stop replicating to the first destination.

Referring to FIG. 10B, operations 1000 pertaining to generating replication policies are further described. A replication policy for a dataset is generated at least by associating the dataset with a replication tag. Additionally, or alternatively, the replication policy for a dataset may be generated at least by initiating a credential generation process for generating a replication credential. As shown in FIG. 10B, the system identifies a dataset associated with a request to generate a replication policy (Operation 1020). The request to generate the replication policy may include information that the system utilizes to identify the dataset. In one example, the request includes a network address or a network ID of the dataset. The system may identify the dataset base don the network address or the network ID.

Upon having identified the dataset, the system determines whether a replication tag is associated with the dataset (Operation 1022). A replication tag may be included in metadata associated with the dataset. The system may determine whether a replication tag is associated with the dataset by accessing metadata associated with the dataset and determining whether the metadata includes a replication tag. Additionally, or alternatively, a replication tag may be mapped to the dataset. The system may determine whether a replication tag is mapped to the dataset. In one example, metadata associated with the dataset includes a tag key that identifies the replication tag. Additionally, or alternatively, the replication tag may be located in a replication tag repository. The system may identify the replication tag in the replication tag repository based at least in part on the replication tag. When the system determines that a replication tag is associated with the dataset, the system may generate the replication policy for the dataset by modifying the replication tag that is associated with the dataset.

When the system determines that a replication tag is not associated with the dataset, the system generates a replication tag and stores the replication tag in a data structure associated with the dataset (Operation 1024). In one example, the system generates a replication tag in metadata associated with the dataset. Additionally, or alternatively, the system may generate the replication tag in a replication tag repository. In one example, a first portion of the replication tag may be located in metadata associated with the dataset and a second portion of the replication tag may be located in a replication tag repository. The system may generate the replication tag by defining one or more data elements that represent at least a portion of the replication tag and adding one or more parameters of the replication tag to the one or more data elements. The system stores the replication tag in a data structure associated with the dataset. The data structure may include metadata where at least a portion of the replication tag is located. Additionally, or alternatively, the data structure may include a least a portion of the replication tag repository. The data structure may store the one or more data elements and/or the one or more parameters of the replication tag. The data structure where the system stores the replication tag may be utilized for verifying replication requests.

In one example, the system determines whether the replication policy requires a destination restriction (Operation 1026). The system may determine whether the replication policy requires a destination restriction after determining that a replication tag is associated with the dataset at operation 1020, or after generating a replication tag associated with the dataset at operation 1024. The system may determine whether the replication policy requires a destination restriction based on the request to generate the replication policy. In one example, the request to generate the replication policy includes an identification of a destination location where the replication policy will allow the dataset to be replicated. The presence of a destination location in the request to generate the replication policy may indicate that the replication policy requires a destination restriction. The system may determine that the replication policy requires a destination restriction when the request to generate the replication policy identifies a destination location. Additionally, or alternatively, the system may determine whether the replication policy requires a destination restriction based on one or more access polices defined by an IAM system. The one or more access policies may require replication policies defined by replication tags to include a destination restriction. When the system determines that one or more access policies require a destination restriction, the system may determine that the replication policy requires a destination restriction.

When the system determines that the replication policy requires a destination restriction, the system adds a destination key to the replication tag (Operation 1028). The replication tag may include one or more destination keys. A destination key identifies a destination where replication of the dataset is allowed. In one example, a destination key identifies a destination partition of the cloud environment where replication of the dataset is allowed. Additionally, or alternatively, a destination key may identify a destination data repository, for example, of a destination partition, where replication of the dataset is allowed.

In one example, the system determines whether the replication policy requires a source restriction (Operation 1030). The system may determine whether the replication policy requires a source restriction after determining that a replication tag is associated with the dataset at operation 1020, or after generating a replication tag associated with the dataset at operation 1024, or after adding a destination key to the replication tag at operation 1028. The system may determine whether the replication policy requires a source restriction based on the request to generate the replication policy. In one example, the request to generate the replication policy includes an identification of a source location where the replication policy will allow the dataset to be replicated from. The presence of a source location in the request to generate the replication policy may indicate that the replication policy requires a source restriction. The system may determine that the replication policy requires a source restriction when the request to generate the replication policy identifies a source location. Additionally, or alternatively, the system may determine whether the replication policy requires a source restriction based on one or more access polices defined by an IAM system. The one or more access policies may require replication policies defined by replication tags to include a source restriction. When the system determines that one or more access policies require a source restriction, the system may determine that the replication policy requires a source restriction.

When the system determines that the replication policy requires a source restriction, the system adds a source key to the replication tag (Operation 1032). The replication tag may include one or more source keys. A source key identifies a source where the dataset is allowed to be accessed for replication. In one example, a source key identifies a source partition of the cloud environment where the dataset is located. Additionally, or alternatively, a source key may identify a source data repository, for example, of a source partition, where the dataset is located.

The system may add one or more destination keys and/or one or more source keys to the replication tag. In one example, the system generates a replication tag by generating or accessing a data structure and storing the replication tag in the data structure. The data structure may include a mapping of the dataset to the replication tag corresponding to the dataset. In one example, the data structure is a metadata element associated with the dataset. In one example, the data structure is a data repository. In one example, the system generating the replication tag and stores the replication tag in the data structure. Additionally, or alternatively, the system may access a replication tag in a data structure and add the one or more destination key and/or one or more source keys to the replication tag. The data structure may include a mapping of the replication tag to one or more destination keys. Additionally, or alternatively, the data structure may include a mapping of the replication tag to one or more source keys. One or more source keys may be mapped to a destination key. In one example, prior to adding a destination key to the replication tag, the replication tag includes one or more additional destination keys that were previously added to the replication tag. In one example, prior to adding a source key to the replication tag, the replication tag includes one or more additional source keys that were previously added to the replication tag.

Upon having added the one or more destination keys and/or the one or more source keys to the replication tag, the system initiates a credential generation process for generating a replication credential that represents authorization to replicate the dataset (Operation 1034). The system may initiate the credential generation process may transmitting a credential generation request to a credential generation service. The credential generation request may include the replication tag and/or information from the replication tag for generating the credential, such as one or more of the following: a destination key corresponding to the replication tag, a source key corresponding to the replication tag, or a tag key corresponding to the replication tag. In one example, the replication credential is generated by an IAM system. In one example, the credential generation service represents a feature of the IAM system.

The credential generation service may include credential verification data and/or replication tag verification data in a replication credential. The credential verification data may include a digital signature of the credential generation service. In one example, the credential verification data may include a public key for verifying the digital signature. Additionally, or alternatively, the public key for verifying the digital signature may be made generally available to one or more computing entities that may verify the replication credential. Additionally, or alternatively, replication requests accompanied by the replication credential may be digitally signed by the requesting computing entity, and the replication credential may include a public key corresponding to a private key utilized by the requesting computing entity to digitally sign the request. One or more computing entities that may verify the replication credential in connection with a replication request may verify the digital signature of the requesting computing entity via the public key in the replication credential.

The replication tag verification data may include one or more of the following in the replication credential: a destination identifier corresponding to a destination key of the replication tag, a source identifier corresponding to a source key of the replication tag, or a tag identifier corresponding to a tag key of the replication tag. Additionally, or alternatively, the credential service may include a copy of the replication tag in the replication credential. In one example, a copy of a destination key of the replication tag serves as a destination identifier of the replication credential. Additionally, or alternatively, a copy of a source key of the replication tag serves as a source identifier of the replication credential. Additionally, or alternatively, a copy of a tag key of the replication tag serves as a tag identifier of the replication credential.

In one example, the set of executable instructions implement the replication policy at least by allowing replication of the dataset to a destination contingent upon verifying that a replication credential, associated with a replication request to replicate the dataset to the destination, includes a destination identifier that corresponds to a destination key of the replication tag. Additionally, or alternatively, the set of executable instructions may implement the replication policy at least by allowing replication of the dataset to the destination contingent upon verifying that the replication credential includes a source identifier that corresponds to a source key of the replication tag. Additionally, or alternatively, the set of executable instructions may implement the replication policy at least by allowing replication of the dataset in accordance with a replication tag contingent upon verifying that the replication credential includes a tag identifier that corresponds to a replication tag.

B. Evaluating Replication Credentials Against Replication Tags to Determine Whether to Grant Replication Requests Referring now to FIGS. 11A and 11B, operations 1100 pertaining to evaluating replication tags against replication credentials are further described. The replication tags are evaluated against the replication credentials to determine whether replication requests accompanied by the replication credentials are allowed by replication policies defined by the replication tags.

Figure 11A:
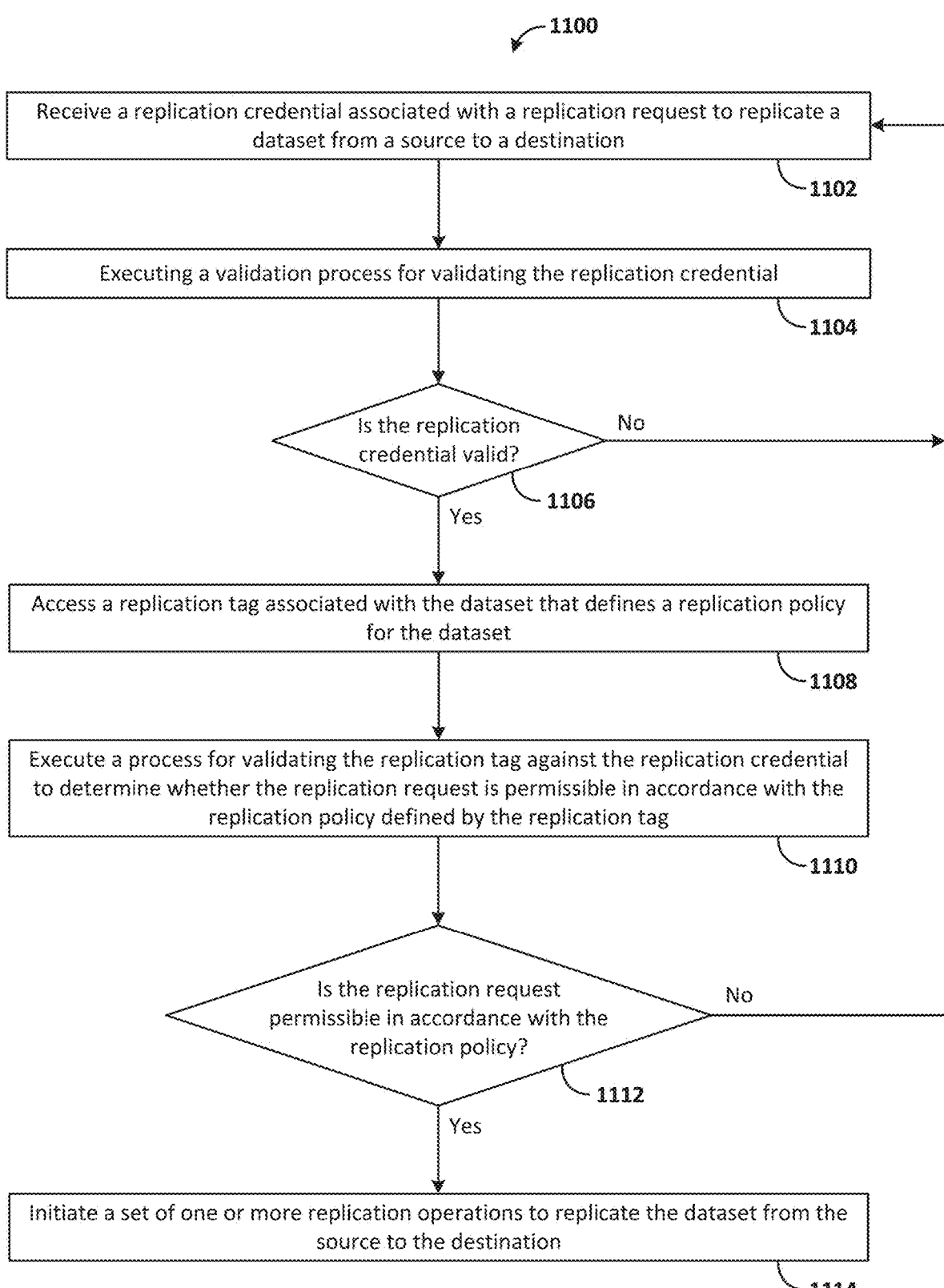
FIGS. 11A and 11B are flowcharts that illustrate example operations pertaining to evaluating replication tags against replication credentials to determine whether replication requests are allowed by replication policies defined by the replication tags in accordance with one or more embodiments.

As shown in FIG. 11A, a system receives a replication credential associated with a replication request to replicate a dataset from a source to a destination (Operation 1102). The source may be a source partition of a cloud environment where the dataset is located. The destination may be a destination partition of the cloud environment where the dataset is requested to be replicated. In one example, the requestion to replicate the dataset includes a request to generate a replication of the dataset in a destination data repository. In one example, the request to replicate the dataset includes a request to apply a data change event to a replication of the dataset located in the destination data repository. The change event may be included in a message. The request to replicate the dataset may represent at least a portion of the message that includes the change event. Additionally, or alternatively, the message may accompany the request to replicate the dataset. Additionally, or alternatively, the message may be transmitted separately, such as subsequent to, the request to replicate the dataset.

In response to the request to replicate the dataset, the system executes a validation process for validating the replication credential (Operation 1104). In one example, the validation process may include validating the replication credential based on credential verification data.

Additionally, or alternatively, the validation process may include verifying one or more identity resources associated with the replication request against one or more access policies associated with the identity resource. The system may determine that replication of the dataset is authorized by the one or more access policies associated with the identity resource. The one or more identity resources may be associated with a computing entity that initiated the replication request. Additionally, or alternatively, the one or more identity resources may be associated with an operator that utilized the computing entity to initiate the replication request. Additionally, or alternatively, the one or more identity resources may be associated with the dataset and/or the data repository where the dataset is located. The one or more identity resources may be represented by an identity credential, such as an identity token. The identity credential may be presented in connection with the replication request. The one or more access policies may be defined by an IAM system. The system may verify the identity resource against one or more access policies by validating the identity credential, such as the identity token, representing the identity resource. Additionally, or alternatively, the system may transmit a verification request to the IAM system and the IAM system may verify the one or more identity resources against one or more access policies associated with the identity resource. The system may reject the replication request in response to determining, based on one or more access policies associated with the identity resource, that replication of the dataset is unauthorized. The system may initiate one or more replication operations responsive at least in part to determining that replication of the dataset is authorized by the one or more access policies associated with the identity resource.

Additionally, or alternatively, the validation process may include verifying that the replication request is initiated from an authorized location, such as a computing entity that is located in the authorized location. In one example, an access policy applicable to the dataset and/or the source location of the dataset may require that requests to replicate one or more datasets located in the source location are initiated from the source location. For example, the access policy may require that a request to replication a dataset from a source partition of a cloud environment to a destination partition of the cloud environment be initiated from the source partition. The system may determine whether the replication request was initiated from an authorized location based on metadata associated with the replication request. In one example, the system determines a location of a computing entity that initiated the replication request based on a network address or a network ID of the computing entity. Additionally, or alternatively, the system may determine the location of the dataset and/or the location of the data repository where the data is located based on a network address or network ID corresponding to the dataset and/or the data repository. Additionally, or alternatively, the metadata may include a parameter that defines whether the location is authorized for initiating replication requests. Additionally, or alternatively, the system may determine whether the replication request was initiated from an authorized location based on one or more access policies associated with the computing entity that initiated the replication request, the dataset and/or the data repository where the dataset is located. The one or more access policies may be defined by an IAM system. The system may reject the replication request in response to determining that the replication request was not initiated from an authorized location. The system may initiate one or more replication operations responsive at least in part to determining that the replication request was initiated from an authorized location.

In one example, an access policy requires that a computing entity that initiates a replication request to replicate a dataset be located in the same partition of a cloud environment as a data repository where the dataset is located. The system receives a first replication request to replicate a dataset from a source data repository located in a source partition of a cloud environment to a destination data repository located in a destination partition of the cloud environment. The system determines that the first replication request was initiated by a computing entity located in the destination partition. The destination partition is a different partition than the source partition. The destination partition is a location external to the source partition. Based on the data repository and the computing entity that initiated the first replication request being located in different partitions and/or based on the request being initiated from a location external to the source partition, the system rejects the replication request. Additionally, or alternatively, the system receives a second replication request to replicate the dataset from the source data repository located in the source partition of the cloud environment to the destination data repository located in the destination partition of the cloud environment. The system determines that the second replication request was initiated by a computing entity located in the source partition. Based at least in part on the data repository and the computing entity that initiated the second replication request being located in the same partition, the system may proceed with the operations 1100 for validating the replication credential.

Based on the validation process, the system determines whether the replication credential valid (Operation 1106). Additionally, the system may determine whether the replication request associated with the replication credential is valid. When the system determines that the replication credential and/or the replication request is invalid, the system rejects the request to replicate the dataset. When the system successfully validates the replication credential and/or the replication request, the system initiates a process for validating one or more replication tags associated with the dataset against the replication credential. The one or more replication tags define replication policies for—the dataset. The system determines whether the replication request is permissible in accordance with one or more replication policies defined by the one or more replication tags.

In one example, to initiate the process for validating one or more replication tags against the replication credential, the system accesses a replication tag associated with the dataset that defines a replication policy for the dataset (Operation 1108). The system may access the replication tag based at least in part on replication tag verification data in the replication credential. Additionally, or alternatively, the system may access the replication tag based on a data structure associated with the dataset where the replication tag is stored. In one example, the system accesses the replication tag in a metadata file associated with the dataset. The metadata file may include a metadata element. The metadata element may include the replication tag. The system may identify the metadata file and/or the replication tag in the metadata file based on a tag identifier corresponding to the replication tag. The system may access the tag identifier from in the replication credential. Additionally, or alternatively, the system may access the replication tag in a replication tag repository where the replication tag is stored. The system may identify the replication tag in the replication tag repository based on a tag identifier corresponding to the replication tag. The system may access the tag identifier from in the replication credential and/or the metadata file. Additionally, or alternatively, the replication request may include a dataset identifier such as a network ID or a network address corresponding to the dataset. The system may access the replication tag based on the network ID or the network address corresponding to the dataset and a mapping between the replication tag and the dataset.

Upon having accessed the replication tag, the system executes a process for validating the replication tag against the replication credential (Operation 1110). The process for validating the replication tag against the replication credential may include validating a tag key of the replication tag against a tag identifier in the replication credential. Additionally, or alternatively, the process for validating the replication tag may include validating a destination key of the replication tag against a destination identifier in the replication credential. Additionally, or alternatively, the process for validating the replication tag may include validating a source key of the replication tag against a source identifier in the replication credential. The system may repeat the process for multiple replication tags associated with the request to replicate the dataset. Operations pertaining to validating the replication tag against the replication credential are further described below with reference to FIG. 11B.

Based on the process for validating the replication tag against the replication credential, the system determines whether the replication request is permissible in accordance with the replication policy defined by the replication tag (Operation 1112). When the system determines that the replication request is impermissible in accordance with the replication policy, the system rejects the request to replicate the dataset. When the system successfully determines that the replication request is permissible in accordance with the replication policy, the system initiates a set of one or more replication operations to replicate the dataset from the source to the destination (Operation 1114).

In one example, the one or more replication operations include directing a replication of the dataset to the destination. The system may direct the replication of the dataset from a source data repository located in source partition of a cloud environment to a destination located in a destination partition of the cloud environment. Upon directing the replication of the dataset to the destination, the replication of the dataset is stored in the destination data. Additionally, or alternatively, the one or more replication operations include directing a message that includes a data change event associated with the dataset to the destination. The system may direct the message from a source data repository located in source partition of a cloud environment to a destination located in a destination partition of the cloud environment. Upon directing the message to the destination, the data change event is applied to a replication of the dataset stored in the destination data.

In one example, the one or more replication operations include configuring a streaming subscription for streaming messages, including data associated with the dataset, from the source data repository to the destination data repository. The messages may include change events that represent changes to the dataset. The source data repository may be located in a source partition of a cloud environment. The destination data repository may be located in a destination partition of the cloud environment. Operations pertaining to streaming messages are further described below with reference to FIGS. 12A and 12B.

Figure 11B:
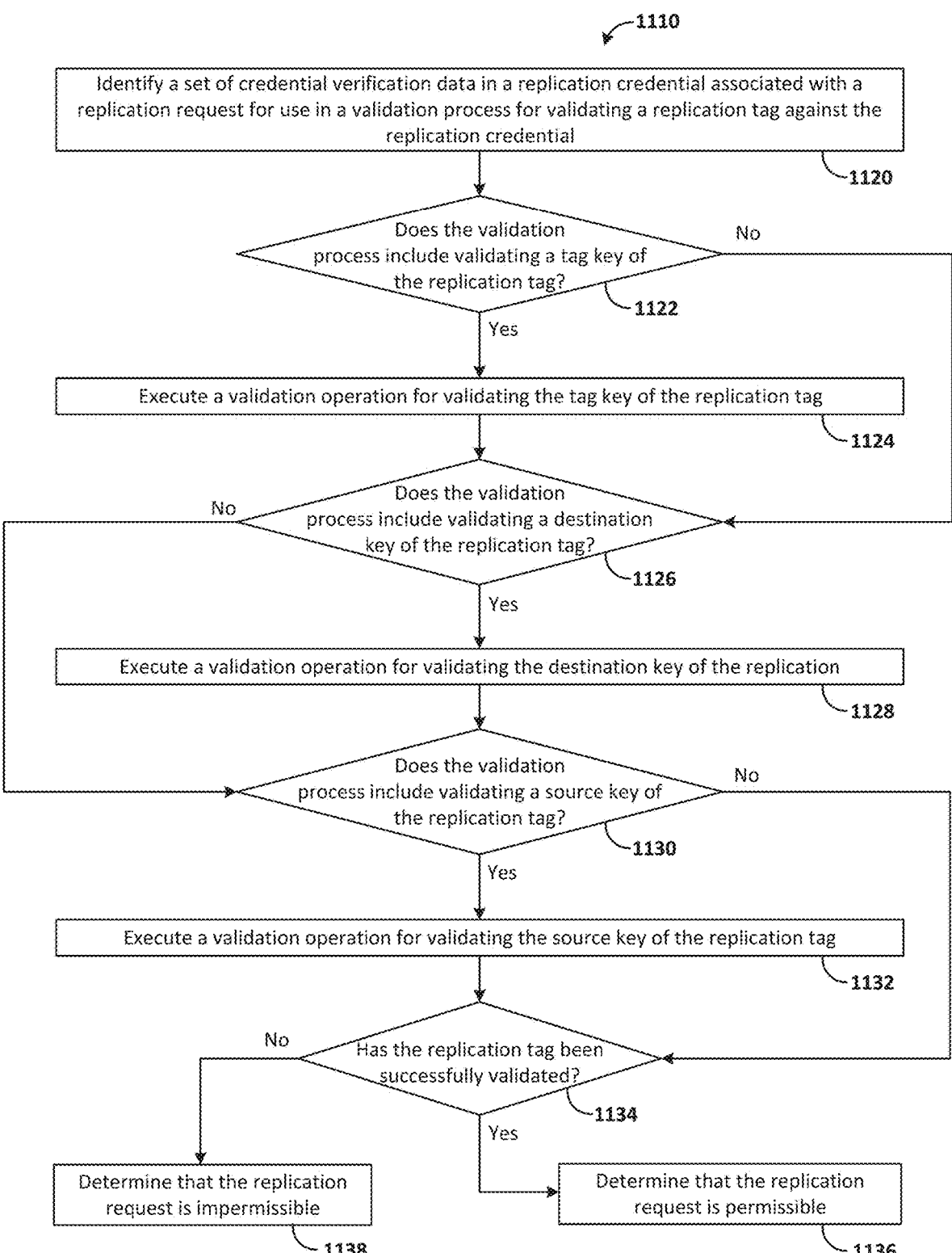

Referring to FIG. 11B, operations 1100 pertaining to validating replication tags against replication credentials are further described. In one example, a process for validating a replication tag against a replication credential may include one or more of the operations 1100 described with reference to FIG. 11B. In one example, the particular validations performed in a process for validating a replication tag against a replication credential may be defined by executable instructions maintained by the system. The executable instructions may be configured to perform one or more of the following operations 1100: validating a tag key of a replication tag against a tag identifier in a replication credential, validating a destination key of a replication tag against a destination identifier in a replication credential, validating a source key of a replication tag against a source identifier in a replication credential, or validating a mapping between a source key and a destination key of a replication tag against a mapping between a source identifier and a destination identifier in a replication credential. In one example, the system may determine that a replication tag is invalid when the replication tag and/or the replication credential is missing content that the executable instructions are configured to validate.

In one example, the particular operations 1100 performed in a process for validating a replication tag against a replication credential may depend on the content of the replication credential. For example, when a replication credential includes a tag identifier, the system may determine that the validation process includes validating a tag key of the replication tag against the tag identifier in the replication credential. As another example, when a replication credential includes a destination identifier, the system may determine that the validation process includes validating a destination key of the replication tag against the destination identifier in the replication credential. As another example, when a replication credential includes a source identifier, the system may determine that the validation process includes validating a source key of the replication tag against the source identifier in the replication credential. As another example, when a replication credential includes a mapping between a source identifier and a destination identifier, the system may determine that the validation process includes validating a mapping between a source key and a destination key of the replication tag against the mapping between the source identifier and the destination identifier in the replication credential.

In one example, the particular operations 1100 performed in a process for validating a replication tag against a replication credential may depend on an absence of content of the replication credential. As one example, when a replication credential does not include a destination identifier or a source identifier, as applicable, the system may determine that the validation process does not includes validating a destination key or a source key, as applicable. As another example, when a replication credential does not include a tag identifier, the system may determine that the validation process does not includes validating a tag key.

As shown in FIG. 11B, to initiate execution of a process for validating a replication tag against a replication credential associated with a replication request, the system identifies a set of credential verification data in the replication credential associated with the replication request (Operation 1120). The system utilizes the credential verification data in the process for validating the replication tag against the replication credential.

In one example, the system determines whether the validation process includes validating a tag key of the replication tag (Operation 1122). When the system determines that the validation process includes validating the tag key of the replication tag, the system executes a validation operation for validating the tag key of the replication tag (Operation 1124). The validation process may include validating the tag key against a tag identifier of the replication credential. The system may validate the tag key against the tag identifier by comparing the value of the tag key to the value of the tag identifier. In one example, the system determines that the tag key is valid when the tag key matches the tag identifier. When the system determines that the validation process does not include validating a tag key, the system refrains from executing the validation operation for validating a tag key.

In one example, the system determines whether the validation process includes validating a destination key of the replication tag (Operation 1126). When the system determines that the validation process includes validating the destination key of the replication tag, the system executes a validation operation for validating the destination key of the replication tag (Operation 1128). The validation process may include validating the destination key against a destination identifier of the replication credential. The system may validate the destination key against the destination identifier by comparing the value of the destination key to the value of the destination identifier. In one example, the system determines that the destination key is valid when the destination key matches the destination identifier. When the system determines that the validation process does not include validating a destination key, the system refrains from executing the validation operation for validating a destination key.

In one example, the system determines whether the validation process includes validating a source key of the replication tag (Operation 1130). When the system determines that the validation process includes validating the source key of the replication tag, the system executes a validation operation for validating the source key of the replication tag (Operation 1132). The validation process may include validating the source key against a source identifier of the replication credential. The system may validate the source key against the source identifier by comparing the value of the source key to the value of the source identifier. In one example, the system determines that the source key is valid when the source key matches the source identifier. When the system determines that the validation process does not include validating a source key, the system refrains from executing the validation operation for validating a source key.

In one example, the validation process for validating the destination key and/or the validation process for validating the source key may include validating a mapping between the source key and the destination key against a mapping of the source identifier and the destination identifier. The system may validate the mapping between the source key and the destination key by determining whether the source identifier corresponding to the source key is mapped to a destination identifier corresponding to the destination key. In one example, the system determines that the mapping between the source key and the destination key is valid when the mapping matches a mapping of the source identifier and the destination identifier. In one example, to validate the mapping, the system accesses a mapping of the destination key to a set of one or more source keys that identify one or more datasets that are permissible to be replicated to the destination corresponding to the destination key in accordance with the replication policy defined by the replication tag. The system may validate, based on the mapping of the destination key to the set of one or more source keys, that the set of one or more source keys includes a source key that identifies the dataset as being permissible to be replicated to the destination corresponding to the destination key.

Upon having executed the one or more validation operations, the system determines whether the replication tag been successfully validated (Operation 1134). The system may determine that the replication tag has been successfully validated when the set of validation operations in the validation process are successful. When the system determines that validation of the replication is successful, the system determines that the replication request is permissible (Operation 1136). The system may determine that validation of the replication tag is unsuccessful when one or more of the validation operations in the validation process are unsuccessful. When the system determines that validation of the replication is unsuccessful, the system determines that the replication request is impermissible (Operation 1138).

C. Utilizing Replication Tags For Streaming Messages

Figure 12A:
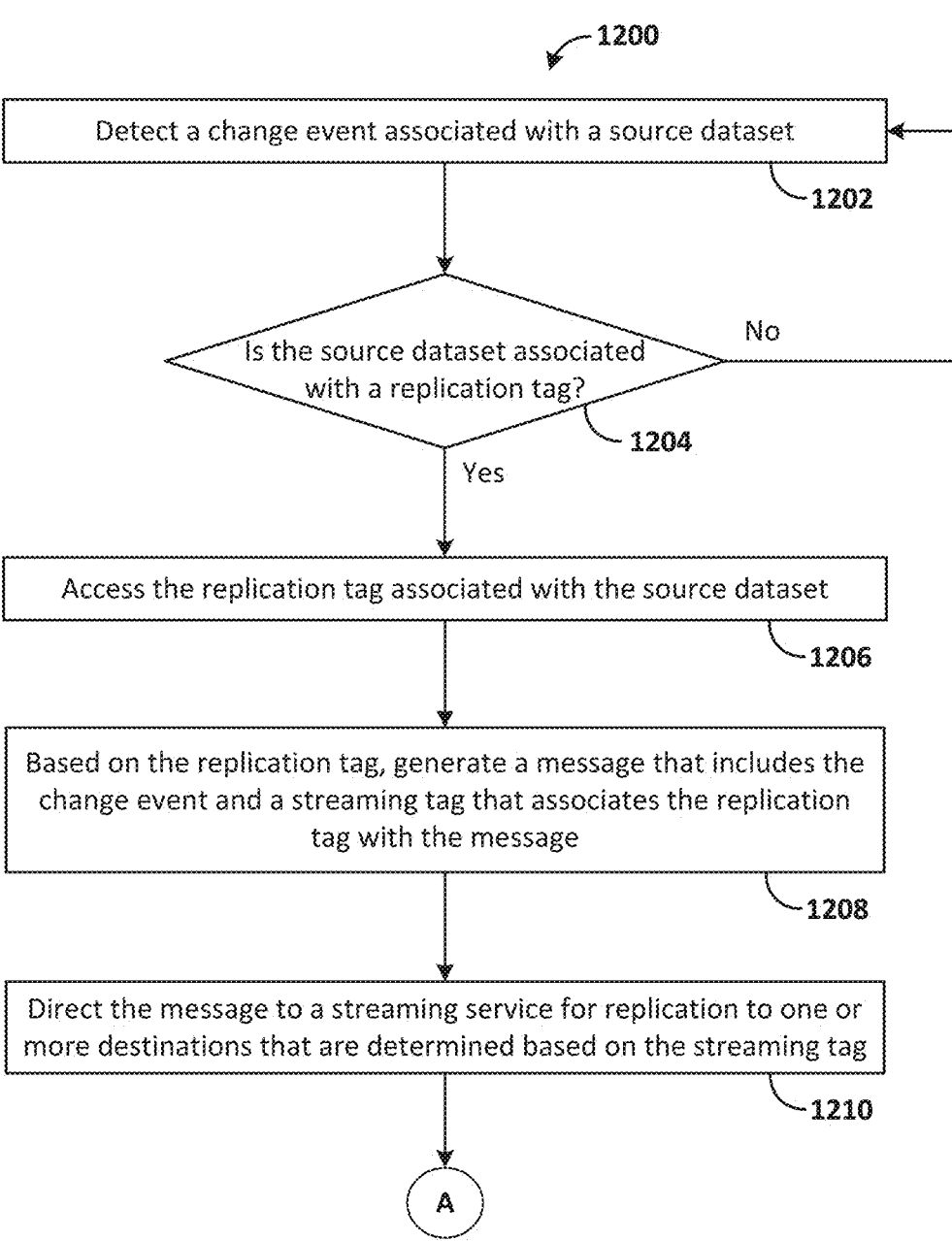
FIGS. 12A and 12B are flowcharts that illustrate example operations pertaining to utilizing replication tags for streaming messages in accordance with one or more embodiments.
Figure 12B:
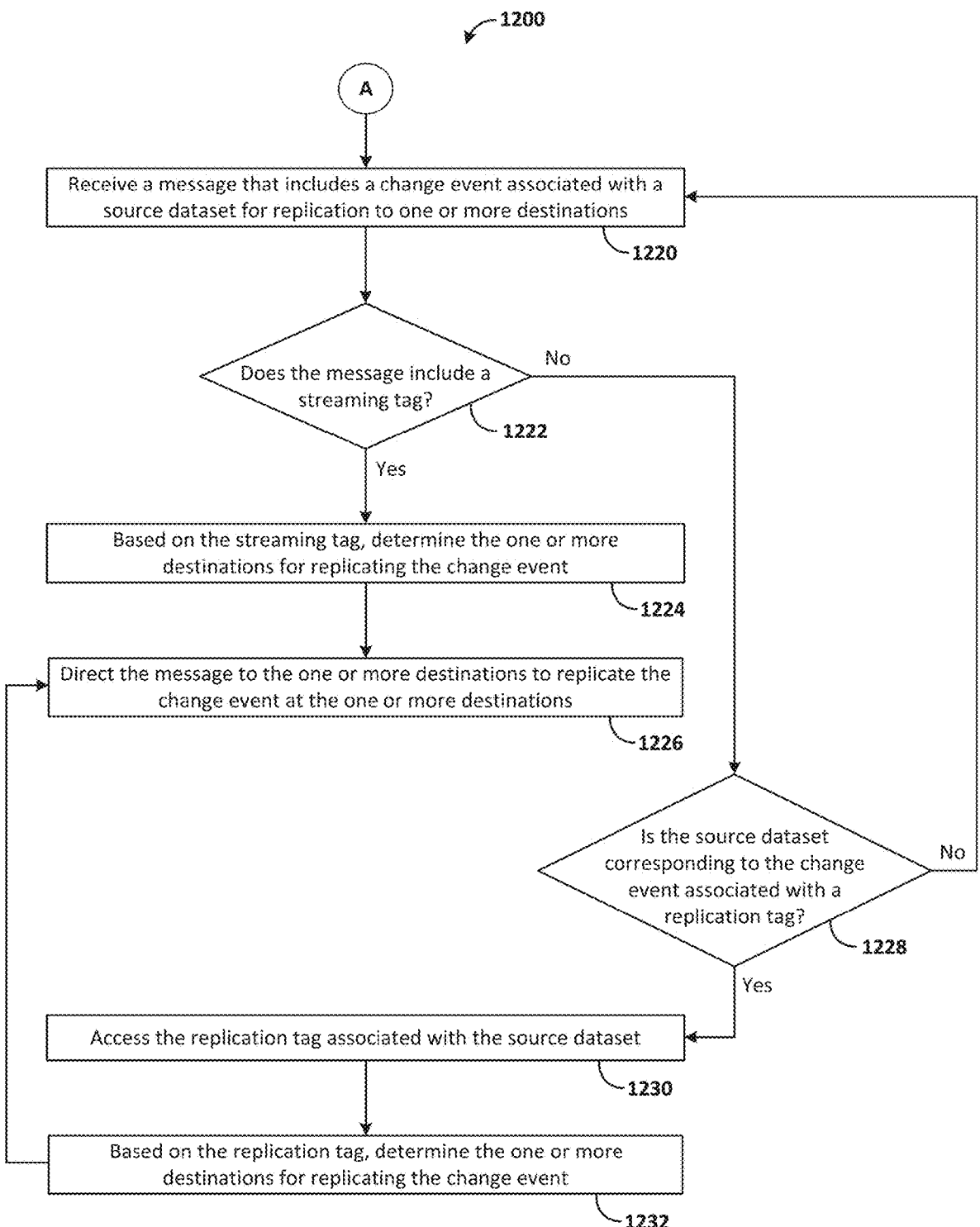

Referring now to FIGS. 12A and 12B, operations 1200 pertaining to utilizing replication tags for streaming messages are further described. The replication tags may be utilized to generate messages that include change events to be replicated at one or more destinations. Additionally, or alternatively, the replication tags may be utilized to determine destinations for directing messages that include one or more change events to replicate the one or more change events at the destinations determined based on the replication tags.

Referring to FIG. 12A, a system may process a stream that includes multiple change events associated with one or more source datasets. The system generates messages that include a change event and a streaming tag associated with the change event. The system directs the messages to a streaming service for replication to one or more destinations that are determined based on the streaming tags in the messages. As shown in FIG. 12A, a system detects a change event associated with a source dataset (Operation 1202). In one example, the system detects the change event in a data monitoring feed from a logging and monitoring tool. Additionally, or alternatively, the system may detect the change event via a managed database or storage service. Additionally, or alternatively, the system may utilize a polling service to periodically check for changes. The polling service may compare states of the source datasets.

In response to detecting the change event, the system determines whether the source dataset is associated with a replication tag (Operation 1204). The system may determine whether the source dataset is associated with a replication tag based on an association between the change event and the source dataset corresponding to the change event. In one example, the change event may include metadata or a tag that identifies the source dataset. The tag may include a network address and/or a network ID of the source dataset. Additionally, or alternatively, the change event may include a tag that identifies metadata associated with the source dataset and/or a replication tag repository. Based these or other sources of information associated with the change event, the system determines whether the source dataset is associated with a replication tag. Additionally, or alternatively, the replication tag may be appended to the change event, for example, by a logging and monitoring tool and/or a managed database or storage service.

When the system determines that the change event is associated with a replication tag, the system accesses the replication tag associated with the source dataset (Operation 1206). The system may access the replication tag by accessing a metadata file and/or a replication tag repository where the replication tag is located. Based on the replication tag, the system generates a message that includes the change event and a streaming tag that associates the replication tag with the message (Operation 1208). The system may generate the message by combining the change event and the streaming tag in accordance with a defined message structure. The system may generate the message in JSON, XML, or another suitable format. The streaming tag may include data from the replication tag. In one example, the system reproduces at least a portion of the replication tag as the streaming tag. The system may append the streaming tag to the change event and/or to the message.

In one example, the streaming tag include a destination key that identify a destination for replicating the change event. In one example, the streaming tag includes a source key, and the system determines one or more destinations for replicating the dataset based on a mapping of the source key to one or more destination keys that identify one or more destinations corresponding to one or more destination data repositories for replicating the change event. The system may determine the one or more destination keys based on a mapping of the source key of the streaming tag to a replication tag that includes the one or more destination keys. In one example, the system maps the source key of the streaming tag to a source key of the replication tag that is mapped to the one or more destination keys. In one example, the streaming tag includes a tag key, and the system determines one or more destinations for replicating the dataset based on a mapping of the tag key to one or more destination keys that identify one or more destinations corresponding to one or more destination data repositories for replicating the change event. The system may determine the one or more destination keys based on a mapping of the tag key of the streaming tag to a replication tag that includes the one or more destination keys. In one example, the system maps the tag key of the streaming tag to a tag key of the replication tag that is mapped to the one or more destination keys.

Upon generating the message that includes the change event and a streaming tag, the system directs the message to a streaming service for replication to one or more destinations that are determined based on the streaming tag (Operation 1210). Operations 1200 pertaining to utilizing replication tags are further described with reference to FIG. 12B. The system may execute the operations 1200 described with reference to FIG. 12B following execution of the operations described with reference to FIG. 12A. Additionally, or alternatively, the system may execute the operations 1200 described with reference to FIG. 12B without previously executing one or more of the operations described with reference to FIG. 12A.

In one example, the system determine that, based on the presence of a replication tag associated with the change event, replication of the change event is in accordance with one or more replication policies defined by the replication tag associated with the change event. Additionally, or alternatively, the system may validate the replication tag prior to generating the message and/or prior to directing the message to the streaming service. In one example, the system determines that the source dataset corresponding to the change event is subscribed to a streaming service for replicating change events associated with the source dataset to one or more destination datasets. The system may determine that, based on the source dataset being subscribed to the streaming service, that replication of the change event is in accordance with one or more replication policies defined by the replication tag. For example, the replication tag may be validated prior to subscribing the source dataset to the streaming service. Additionally, or alternatively, the system may determine whether the replication tag is valid prior to generating the message. The system may execute a process for validating the replication tag by executing one or more operations described with reference to operation 1110 of FIGS. 11A and 11B. Additionally, or alternatively, the system may determine whether the replication tag is valid based on a replication credential associated with the replication tag. In one example, the system may store the replication credential, for example, when initiating the subscription for the streaming service. The system may access the replication credential and execute a validation process for validating the replication credential prior to generating the message and/or prior to directing the message to the streaming service. The System may execute the validation process, for example, as described with reference to operation 1104 of FIG. 11A. In one example, the system periodically executes operations for validating the replication tag and/or the replication credential prior to generating a message and/or prior to directing a message to the streaming service. The period for executing the operations for validating the replication tag and/or the replication credential may be based at least in part on a time period and/or a quantity of change events and/or messages processed by the system.

Referring to FIG. 12B, the system may process a stream that includes multiple messages. The messages may include one or more change events corresponding to one or more source datasets, respectively. As shown in FIG. 12B, the system receives a message that includes a change event associated with a source dataset for replication to one or more destinations (Operation 1220). The message may be received at a streaming service for replicating a source dataset from a source data repository to one or more destination data repositories, for example, based on change events that represent changes to the source dataset in the source data repository.

The system determines whether the message include a streaming tag (Operation 1222). The system may determine whether the message includes a streaming tag by checking the message for a particular marker or symbol that denotes a tag. In one example, the message is structured according to a schema that includes tag definitions, such as JSON or XML. The system may identify a streaming tag based on the structure format of the message, Additionally, or alternatively, the system may identify a streaming tag based on a regular expression or a special character that identifies the streaming tag. When the system determines that the message does not include a streaming tag, the operations 1200 may proceed to operation 1228 described below.

When the system determines that the message include a streaming tag, based on the streaming tag, the system determines the one or more destinations for replicating the change event (Operation 1224). The system may determine the one or more destinations for replicating the change event based on one or more destination keys that identify the one or more destinations for replicating the change event. In one example, the one or more destination keys are included in the streaming tag. The system may identify the one or more destination keys in the streaming tag by parsing the streaming tag to check for destination keys. Additionally, or alternatively, streaming tag may include one or more source keys and/or one or more tag keys that are mapped to one or more replication tags that include the one or more destination keys. The system may identify the one or more source keys and/or the one or more tag keys in the streaming tag by parsing the streaming tag. Upon identifying a source key and/or a tag key in a streaming tag (e.g., in a streaming tag that does not include a destination key), based the source key or the tag key, the system may access a replication tag corresponding to the source key or the tag key. The replication tag may be located in a replication tag repository and/or in metadata associated with the source dataset corresponding to the change event. Based on the replication tag, the system may identify one or more destination keys that that are mapped to the source key and/or the tag key of the replication tag. Upon identifying the one or more destination keys, based on the one or more destination keys, the system determines the one or more destinations for replicating the change event.

Upon identifying the one or more destinations for replicating the change event, the system directs the message to the one or more destinations to replicate the change event at the one or more destinations (Operation 1226). The message is received at the one or more destinations and the change event in the message is replicated in one or more destination data repositories. Upon replicating the change event at a destination data repository, a state of the destination data repository as of replicating the change event at the destination data repository matches a state of the source data repository as of the change event having occurred at the source data repository. In one example, the system includes a streaming service that directs the message from the streaming service to a data update agent associated with a destination data repository. The data update agent receives the message from the streaming service and applies the change event in the message to the destination dataset in the destination data repository.

In one example, the system accesses a streaming tag included in a message, and the streaming tag includes a copy of a replication tag associated with the source dataset corresponding to the change event. The copy of the replication tag, in the streaming tag, includes a tag element that is mapped to one or more destination keys that identify one or more destination datasets where the change event is to be replicated. The tag element may include a source key or a tag key. The system determines that the tag element is mapped to a destination key, of one or more destination keys, that identifies a destination for replicating the change event, and responsive at least in part to determining that the tag element is mapped to the destination key, the system directs the message to the destination to replicate the change event.

In one example, the system accesses a streaming tag included in a message, and the streaming tag includes a tag element that is mapped to a replication tag that includes one or more destination keys that identify one or more destination datasets where the change event is to be replicated. The tag element may include a source key or a tag key. The source tag or the tag key may be added to the streaming tag from the replication tag. In one example, the system accesses the replication tag based on the tag element of the streaming tag. The system may access the replication tag in metadata associated with the source dataset corresponding to the change event and/or in a replication tag repository. The system determines that the tag element is mapped to a destination key, of one or more destination keys, that identifies a destination for replicating the change event, and responsive at least in part to determining that the tag element is mapped to the destination key, the system directs the message to the destination to replicate the change event.

In one example, the system accesses a first metadata element associated with the message that includes the streaming tag. The streaming tag of the first metadata element includes a tag element. The tag element may include a source key that identifies the source dataset corresponding to the change event. Additionally, or alternatively, the tag element may identify a second metadata element associated with the source dataset. The second metadata element may include a replication tag. The first metadata element may be mapped to the second metadata element. The system may access the second metadata element based on the first metadata element, for example, based on the mapping of the first metadata element to the second metadata element.

In one example, the system determines that a replication tag, copied to the source tag or mapped to the source tag by a tag element, includes a source key that identifies the source dataset corresponding to the change event. The system accesses a set of one or more mappings of the source key to a set of one or more destination keys. In one example, the one or more mappings are included within the replication tag. In one example, the one or more mappings are included in a replication tag repository. Based on the set of one or more mapping, the system determines that the source key is mapped to a destination key and directs the message to a destination corresponding to the destination key to replicate the change event. The system may direct the message to one or more destinations based on the set of one or more mappings. The one or more destinations may represent a subset of available destinations where the system may direct messages for replicating change events. When the system directs a message to one or more destinations for replication that represent a first subset of available destinations, the system may refrain from directing the message to other destinations of the subset of available destinations that are not identified by a destination key corresponding to the message.

Referring again to operation 1222, when the system determines that a message does not include a streaming tag, the system may determine whether the source dataset corresponding to the change event in the message is associated with a replication tag (Operation 1228). In one example, when a message does not include a streaming tag, the system may determine one or more destinations for replicating the change event based on a replication tag associated with the source dataset corresponding to the change event. The system may determine whether the source dataset corresponding to the message is associated with a replication tag based on metadata or a tag appended to the message and/or to the change event that identifies the source dataset. In one example, the metadata or the tag may include a network ID or a network address that identifies the source dataset. Additionally, or alternatively, the change event may include a tag that identifies metadata associated with the source dataset and/or a replication tag repository. Based these or other sources of information associated with the change event, the system determines whether the source dataset is associated with a replication tag. Additionally, or alternatively, the replication tag may be appended to the change event, for example, by a logging and monitoring tool and/or a managed database or storage service.

Upon determining that the source dataset corresponding to the change event is associated with a replication tag, the system accesses the replication tag associated with the source dataset (Operation 1230). The system may access the replication tag by accessing a metadata file and/or a replication tag repository where the replication tag is located. Based on the replication tag, the system determines the one or more destinations for replicating the change event (Operation 1232). The system may determine the one or more destinations for replicating the change event based on one or more destination keys in the replication tag that identify the one or more destinations for replicating the change event. Upon determining the one or more destinations for replication the change event based on the replication tag, the system directs the message to the one or more destinations (Operation 1226).

In one example, the system accesses a replication tag that includes a tag element. The tag element may include a source key or a tag key. The system determines that the tag element is mapped to one or more destination keys that identify one or more destination datasets where the change event is to be replicated. The system determines that the tag element is mapped to a destination key, of one or more destination keys, that identifies a destination for replicating the change event, and responsive at least in part to determining that the tag element is mapped to the destination key, the system directs the message to the destination to replicate the change event.

In one example, the system determines that the replication tag includes a source key that identifies the source dataset corresponding to the change event. The system accesses a set of one or more mappings of the source key to a set of one or more destination keys. The one or more mappings may be located in metadata or in a replication tag repository where at least a portion of the replication tag is stored. Based on the set of one or more mapping, the system determines that the source key is mapped to a destination key and directs the message to a destination corresponding to the destination key to replicate the change event. When the system directs a message to one or more destinations for replication that represent a first subset of available destinations, the system may refrain from directing the message to other destinations of the subset of available destinations that are not identified by a destination key corresponding to the message.

In one example, the system determine that, based on a streaming tag being included in the message, replication of the change event included in the message is in accordance with one or more replication policies defined by a replication tag corresponding to the change event. Additionally, or alternatively, the system may validate the replication tag prior to directing the message to the one or more destinations for replication. In one example, the system determines that the source dataset corresponding to the change event in the message is subscribed to a streaming service for replicating change events associated with the source dataset to one or more destinations. The system may determine that, based on the source dataset being subscribed to the streaming service, that replication of the change event is in accordance with one or more replication policies defined by the replication tag. For example, the replication tag may be validated prior to subscribing the source dataset to the streaming service and/or prior to generating the message. The system may execute a process for validating the replication tag by executing one or more operations described with reference to operation 1110 of FIGS. 11A and 11B. Additionally, or alternatively, the system may determine whether the replication tag is valid based on a replication credential associated with the replication tag. In one example, the system may store the replication credential, for example, when initiating the subscription for the streaming service. The system may access the replication credential and execute a validation process for validating the replication credential prior to directing the message to the one or more destinations. The System may execute the validation process, for example, as described with reference to operation 1104 of FIG. 11A. In one example, the system periodically executes operations for validating the replication tag and/or the replication credential prior to directing a message to the one or more destinations. The period for executing the operations for validating the replication tag and/or the replication credential may be based at least in part on a time period and/or at least in part on a quantity of messages processed by the system.

In one example, the system may receive a request to terminate streaming of change events associated with a source dataset to one or more destinations where change events associated with the source dataset are replicated. The request to terminate streaming may be applicable to all or a subset of destinations where change events associated with the source dataset are replicated. In response to the request to terminate streaming steaming of change events associated with the source dataset, the system may identify and delete a mapping that maps a source key to a destination key corresponding to a destination, of the one or more destinations.

9. Miscellaneous; Extensions

Embodiments are directed to a system with one or more devices that include a hardware processor and that are configured to perform any of the operations described herein and/or recited in any of the claims below. Embodiments are directed to a system that includes means to perform any of the operations described herein and/or recited in any of the claims below. In an embodiment, a non-transitory, computer-readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. Accordingly, the specification and drawings are to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if the references were individually and specifically indicated to be incorporated by reference and were set forth in entirety herein.

What is claimed is:

1. A method, comprising:
receiving, by a streaming service, a first message comprising a first change event associated with a first source dataset for replication to a first set of one or more destinations in a cloud environment;
accessing, by the streaming service, a first replication tag associated with the first message,
   wherein the first replication tag comprises a first tag element and the first tag element comprises a first set of one or more destination keys that identify a first set of one or more destination datasets, corresponding to the first set of one or more destinations, where the first change event is to be replicated;
determining, by the streaming service, that the first tag element of the first replication tag comprises a first destination key, of the first set of one or more destination keys, that identifies a first destination, of the first set of one or more destinations, for replicating the first change event to a first destination dataset corresponding to the first destination;
responsive at least in part to determining that the first tag element comprises the first destination key, directing the first message to the first destination to replicate the first change event to the first destination dataset;
wherein the method is performed by at least one device including a hardware processor.

2. The method of claim 1, further comprising:
determining, by the streaming service, that the first tag element of the first replication tag comprises a second destination key, of the first set of one or more destination keys, that identifies a second destination, of the first set of one or more destinations, for replicating the first change event to a second destination dataset corresponding to the second destination;
responsive at least in part to determining that the first tag element comprises the second destination key, directing the first message to the second destination to replicate the first change event to the second destination dataset.

3. The method of claim 1, further comprising:
determining that the first replication tag comprises a first source key that identifies the first source dataset corresponding to the first change event;

accessing, by the streaming service, a set of one or more mappings of the first source key to the first set of one or more destination keys;
determining, based on the set of one or more mappings of the first source key to the first set of one or more destination keys, that the first source key the first destination key of the first set of one or more destination keys;
responsive further in part to determining that the first source key the first destination key, directing the first message to the first destination to replicate the first change event to the first destination dataset.

4. The method of claim 3,
determining, based on the set of one or more mappings of the first source key to the first set of one or more destination keys, that the first source key is mapped to a second destination key, of the first set of one or more destination keys, that identifies a second destination, of the first set of one or more destinations, for replicating the first change event to a second destination dataset corresponding to the second destination;
responsive at least in part to determining that the first source key is mapped to the second destination key, directing the first message to the second destination to replicate the first change event to the second destination dataset.

5. The method of claim 3, further comprising:
refraining from directing the first message to a second destination for replicating change events to a second destination dataset responsive at least in part to:
   determining that the first source key is mapped to the first destination key; or
   determining that the first source key is not mapped to a second destination key that identifies the second destination for replicating the first change event to the second destination dataset.

6. The method of claim 3, further comprising:
subsequent to directing the first message to the first destination to replicate the first change event to the first destination dataset:
   receiving a request to terminate streaming of change events from the first source dataset to the first destination corresponding to the first destination dataset;
   identifying, in the set of one or more mappings of the first source key to the first set of one or more destination keys, a first mapping that maps the first source key to the first destination key corresponding to the first destination;
   deleting the first mapping.

7. The method of claim 1, further comprising:
receiving, by the streaming service, a second message comprising a second change event associated with a second source dataset for replication to a second set of one or more destinations in the cloud environment;
accessing, by the streaming service, a second replication tag associated with the second message,
   wherein the second replication tag comprises a second tag element and the second tag element comprises that is mapped a second set of one or more destination keys that identify a second set of one or more destination datasets, corresponding to the second set of one or more destinations, where the second change event is to be replicated;
determining, by the streaming service, that the second tag element of the second replication tag comprises a second destination key, of the second set of one or more destination keys, that identifies a second destination, of the second set of one or more destinations, for replicating the second change event to a second destination dataset corresponding to the second destination;

responsive at least in part to determining that the second tag element comprises the second destination key, directing the second message to the second destination to replicate the second change event to the second destination dataset.

8. The method of claim 7, further comprising:

refraining from directing the second message to the first destination corresponding to the first destination dataset responsive at least in part to:

determining that the second tag element the second destination key corresponding to the second destination; or determining that the second tag element is not mapped to the first destination key corresponding to the first destination.

9. The method of claim 1, wherein accessing the first replication tag associated with the first message comprises:

accessing a metadata element associated with the first message, wherein the metadata element comprises the first replication tag.

10. The method of claim 9, wherein the first tag element comprises a first source key that identifies the first source dataset corresponding to the first change event;

wherein determining that the first tag element of the first replication tag comprises the first destination key comprises:

identifying the first source key as the first tag element of the first replication tag;

accessing a data structure corresponding to the first source key, wherein the data structure comprises a mapping of the first source key to the first set of one or more destination keys;

determining, based on the mapping of the first source key to the first set of one or more destination keys, that the first source key comprises the first destination key of the first set of one or more destination keys;

responsive further in part to determining that the first source key comprises the first destination key, directing the first message to the first destination to replicate the first change event to the first destination dataset.

11. The method of claim 10, wherein the data structure comprises a data repository, wherein the data repository comprises a first mapping of the first source key to the first destination key.

12. The method of claim 10, wherein the data structure comprises a first mapping, within the first replication tag, of the first source key to the first destination key.

13. The method of claim 1, wherein accessing the first replication tag associated with the first message comprises:

accessing a first metadata element associated with the first message, wherein the first metadata element comprises a first source key that identifies at least one of: the first source dataset corresponding to the first change event, or a second metadata element associated with the first source dataset;

accessing, based at least in part on the first metadata element, the second metadata element associated with the first source dataset, wherein the second metadata element comprises the first replication tag, and wherein the first metadata element the first tag element of the first replication tag.

14. The method of claim 1, further comprising:

prior to receiving the first message:

detecting the first change event associated with the first source dataset;

generating the first message, wherein generating the first message comprises: associating with the first message, a first metadata element comprising a first source key that identifies the first source dataset corresponding to the first change event;

wherein accessing the first replication tag comprises:

identifying the first replication tag based on a mapping of the first source key to the first tag element of the first replication tag.

15. The method of claim 14, further comprising:

subsequent to generating the first message:

directing the first message to the streaming service.

16. The method of claim 1, further comprising:

processing a stream comprising a plurality of change events corresponding to a plurality of source datasets, wherein the plurality of source datasets comprises the first source dataset corresponding to the first change event, wherein processing the stream comprises:

determining that the first change event is associated with the first source dataset;

responsive to determining that the first change event is associated with the first source dataset, generating the first message comprising the first change event and a first streaming tag that associates the first replication tag with the first message, wherein the first replication tag is identifiable based at least in part on the first streaming tag, wherein the first streaming tag comprises a first source key that identifies the first source dataset;

subsequent to generating the first message, directing the first message to the streaming service, wherein the streaming service accesses the first replication tag associated with the first message based at least in part on the first streaming tag.

17. The method of claim 1, wherein a data update agent associated with the first destination generates the first message and directs the first message to the streaming service.

18. The method of claim 1, wherein the first destination key comprising to the first tag element of the first replication tag indicates that authorization to replicate change events associated with the first source dataset to the first destination dataset has been successfully verified based at least in part on a first replication credential comprising a first destination identifier that identifies the first destination corresponding to the first destination dataset a location of the cloud environment for replicating the first source dataset.

19. One or more non-transitory computer-readable media comprising instructions that, when executed by one or more hardware processors, cause performance of operations comprising:

receiving, by a streaming service, a first message comprising a first change event associated with a first source dataset for replication to a first set of one or more destinations in a cloud environment;

accessing, by the streaming service, a first replication tag associated with the first message, wherein the first replication tag comprises a first tag element and the first tag element comprises a first set of one or more destination keys that identify a first set of one or more destination datasets, corresponding to the first set of one or more destinations, where the first change event is to be replicated;

determining, by the streaming service, that the first tag element of the first replication tag comprises a first destination key, of the first set of one or more destination keys, that identifies a first destination, of the first set of one or more destinations, for replicating the first change event to a first destination dataset corresponding to the first destination;

responsive at least in part to determining that the first tag element comprises the first destination key, directing the first message to the first destination to replicate the first change event to the first destination dataset.

20. A system comprising:

at least one device including a hardware processor;

the system being configured to perform operations comprising:

receiving, by a streaming service, a first message comprising a first change event associated with a first source dataset for replication to a first set of one or more destinations in a cloud environment;

accessing, by the streaming service, a first replication tag associated with the first message, wherein the first replication tag comprises a first tag element and the first tag element comprises a first set of one or more destination keys that identify a first set of one or more destination datasets, corresponding to the first set of one or more destinations, where the first change event is to be replicated;

determining, by the streaming service, that the first tag element of the first replication tag comprises a first destination key, of the first set of one or more destination keys, that identifies a first destination, of the first set of one or more destinations, for replicating the first change event to a first destination dataset corresponding to the first destination;

responsive at least in part to determining that the first tag element comprises the first destination key, directing the first message to the first destination to replicate the first change event to the first destination dataset.

\* \* \* \* \*